United States Patent
Nering et al.

(10) Patent No.: US 8,359,286 B1
(45) Date of Patent: Jan. 22, 2013

(54) METHOD, APPARATUS, AND ARTICLE OF MANUFACTURE FOR SOLVING LINEAR OPTIMIZATION PROBLEMS INCLUDING LINEAR PROGRAMMING PROBLEMS AND SYSTEMS OF LINEAR EQUATIONS

(75) Inventors: Evar Dare Nering, Scottsdale, AZ (US); Carl Scotius Ledbetter, Jr., Denver, CO (US)

(73) Assignee: Euler Optimization, Inc., Denver, CO (US)

( * ) Notice: Subject to any disclaimer, the term of this patent is extended or adjusted under 35 U.S.C. 154(b) by 693 days.

(21) Appl. No.: 12/481,424

(22) Filed: Jun. 9, 2009

Related U.S. Application Data

(60) Provisional application No. 61/059,971, filed on Jun. 9, 2008.

(51) Int. Cl.
 *G06F 17/00* (2006.01)
 *G06N 5/02* (2006.01)
(52) U.S. Cl. .......................................... 706/46
(58) Field of Classification Search .............. 706/46
 See application file for complete search history.

(56) References Cited

U.S. PATENT DOCUMENTS

| | | | |
|---|---|---|---|
| 4,744,028 A | 5/1988 | Karmarkar | |
| 5,136,538 A | 8/1992 | Karmarkar et al. | |
| 6,078,938 A | 6/2000 | Pan et al. | |
| 6,694,343 B2 | 2/2004 | Forrest et al. | |
| 6,950,844 B2 | 9/2005 | Walster et al. | |
| 7,065,545 B2 | 6/2006 | Quintero-de-la-Garza | |
| 7,877,286 B1 * | 1/2011 | Neal et al. | 705/7.31 |
| 2004/0034556 A1 * | 2/2004 | Matheson et al. | 705/8 |
| 2007/0192406 A1 * | 8/2007 | Frietsch et al. | 709/203 |
| 2008/0147473 A1 * | 6/2008 | Zhong et al. | 705/9 |

OTHER PUBLICATIONS

Dantzig, 1998, Princeton University Press, p. 216-217, "Linear Programming and Extensions".
Nering et al., 1993, Academic Press, Inc., "Linear Programs and Related Problems".

\* cited by examiner

*Primary Examiner* — Kakali Chaki
*Assistant Examiner* — Ababacar Seck
(74) *Attorney, Agent, or Firm* — HolzerIPLaw, PC

(57) ABSTRACT

In accordance with one embodiment of the invention, a method of optimizing a linear equation optimality problem subject to a change of conditions can be accomplished. The method can include determining a first set of conditions for the linear equation optimality problem; initiating processing by a computer to optimize the optimality problem in accordance with the first set of conditions; determining a second set of conditions different from the first set of conditions; continuing processing with the computer to optimize the optimality problem by using the second set of conditions without having to re-initialize the computer.

16 Claims, 1 Drawing Sheet

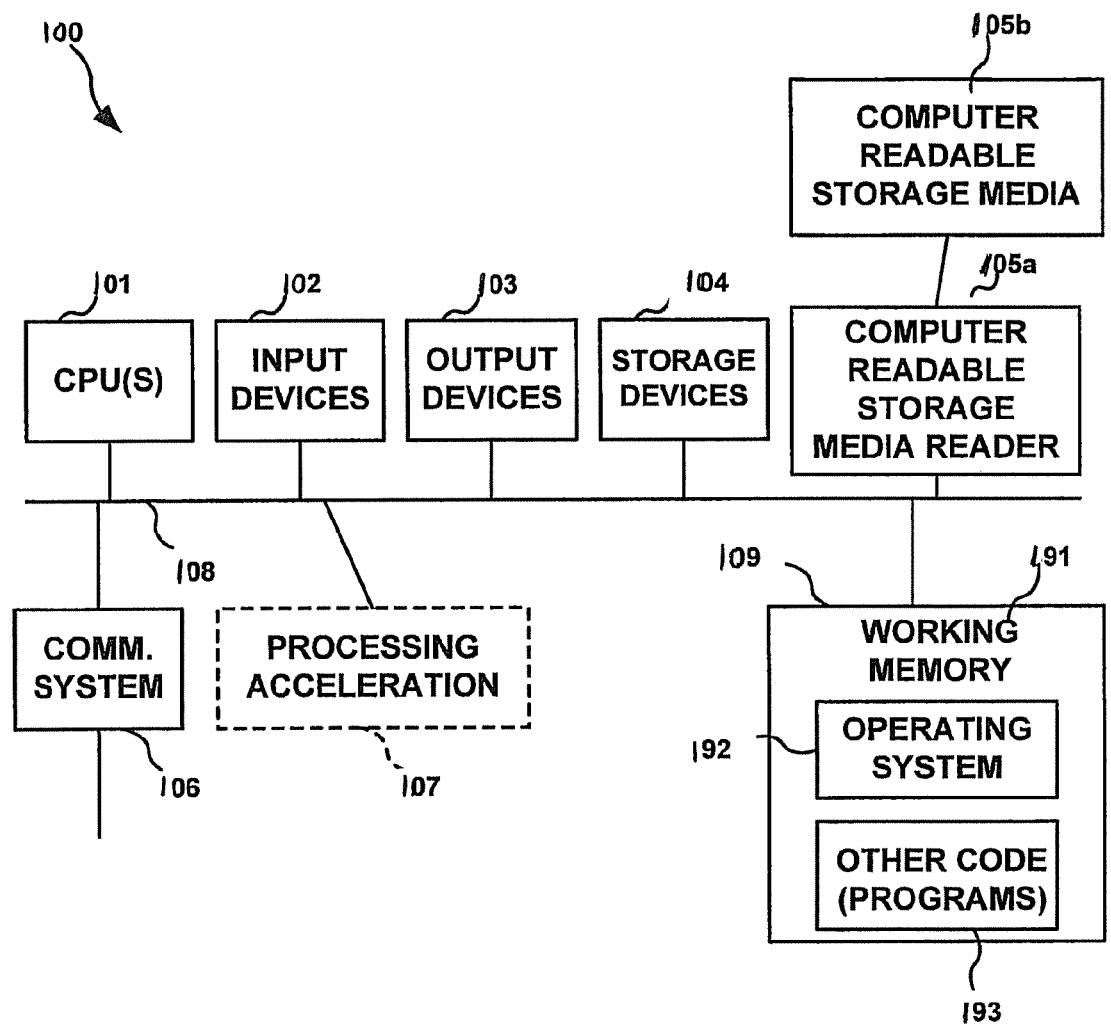

METHOD, APPARATUS, AND ARTICLE OF MANUFACTURE FOR SOLVING LINEAR OPTIMIZATION PROBLEMS INCLUDING LINEAR PROGRAMMING PROBLEMS AND SYSTEMS OF LINEAR EQUATIONS

RELATED APPLICATIONS

This application claims the benefit under 35 USC 119(e) of U.S. Provisional Patent 61/059,971, filed Jun. 9, 2008 the complete disclosure of which is incorporated by reference herein in its entirety and for all purposes.

BACKGROUND

It has been estimated that roughly one half of all scientific and technical computing cycles are used to optimize linear equations (also known as "linear programming"). This is a staggering statistic given that this area of industry is not a household phrase. However, linear equations apply to many of the important industrial and economic operations that are performed in the world today. From distributing resources throughout the world, to the operating of power grids, to the trading of securities, linear equations can be used to find optimum solutions under specified constraints. Thus, the optimization of linear functions with linear constraints is extremely important to the efficient operation of the modern world.

As a more detailed example, an industrial plant has limited resources of equipment, labor, and raw materials. Each of these variables plays a role in how much of each product the plant can produce. Furthermore, each resource has an associated cost. The profit of such an industrial plant can be modeled through the use of linear equations. And, those linear equations can be optimized to determine how much of each resource (equipment, labor, and raw materials) should be used to attain the greatest profit for the plant.

Through the years, people have tried to employ computers to try to optimize linear equations. This has met with mixed success. For example, in the rather slow world of optimizing a process for an industrial plant, an optimum solution could eventually be obtained heuristically over time. Depending on the linear equation and constraints, the computer optimization process might have to be re-run several times to handle problems that might occur initially, including having the problem cycle, find a clearly incorrect answer, or changing conditions. Nevertheless, given the relatively slow nature of some industrial plant processes, such a delay would not cause any real practical difficulty since the best solution can be found quickly enough to be economically practical. However, in faster processes that operate in real time it becomes much more important to have a reliable process that is not subject to error and that is potentially fast.

Several different methods have been used in the past to approach the solving of linear programs. The more popular of these are known as the Simplex Algorithm, the Revised Simplex Algorithm, the Stored Inverse form of the Revised Simplex Algorithm (SIRSA), and the Implied Inverse form of the Revised Simplex Algorithm (IIRSA).

Algebraic methods for solving linear programs, including all previous versions of methods that are based on the Simplex Algorithm, involve constructing a sequence of equivalent representations of the original problem until a representation is obtained for which the solution is obvious. If the original linear programming problem is $Ax=b$ these methods proceed by attempting to generate a sequence of equivalent systems $A_1x=b_1, A_2x=b_2, A_3x=b_3, \ldots, A_kx=b_k$ until the solution can be read off in an obvious way from the final system. If the calculations that are performed to generate such a sequence of equivalent systems are exact, this technique produces an exactly correct solution.

However, when implemented on digital computers, the calculations are almost never exact in problems that occur in the real world because of errors inherent in the way computers do these calculations. Therefore, while theoretically sound, these traditional algebraic methods fail to produce precisely equivalent representations of the original system $Ax=b$ in actual computer implementations due to the computer error. As a result, all previous versions of Simplex-like methods implemented by computer produce results which are not actually solutions to the original problem. The results they achieve are (usually) fairly close to an exact solution, but they contain errors which are hard to quantify. In ill-conditioned problems, the answer may even be completely unacceptable because these methods may produce, because of the accumulation of computer errors, an answer that presents an optimal solution when there is not one, or these methods may fail to find an optimal solution when there is one. Moreover, it can be difficult to tell when the answers that these methods produce are defective in one of these ways.

The accumulation of computer errors can be envisioned from the sequence $A_1x=b_1, A_2x=b_2, A_3x=b_3, \ldots, A_kx=b_k$. This sequence should lead to the optimization of the linear equation system to attain a proposed solution. With the error introduced in each subsequent calculation of A due to computer round-off error, one can appreciate the accumulation of computer error as the processing proceeds to the proposed solution $A_kx=b_k$. For example, the computer error in $A_2$ would be propagated to $A_3$ and the computer error in $A_3$ would be propagated to $A_4$. Thus, while an algebraic technique may work exactly when implemented by hand, the introduction of a computer to perform the calculations leads to computer errors.

The proposed solution to such computer errors in the past has been to use numerical analysis techniques to analyze the solution steps and then try to redo the solution with fewer solution steps so as to reduce the accumulated computer error. Essentially, this has been a post-hoc attempt to reduce the accumulated error after a proposed solution is achieved—and it requires re-attempting a solution.

Another type of problem is encountered when dealing with linear equations whose constraints change during the process of trying to optimize the problem or after an optimal solution has been obtained. For example, one could envision that during the trading of mortgage backed securities that the price of the security could change quickly. As a constraint, the change in price would affect the optimization of the solution to the problem. Thus, one would be required to start over from the beginning with the new value for the price. There are many such problems in industry. These problems are known as being inherently dynamic.

There have been many proposals for dealing with changed data in versions of the Simplex Algorithm after a solution has been obtained. This is called post-optimal analysis or sensitivity analysis. Techniques for doing this are invariably ad hoc with the analysis depending subjectively on the actual numbers encountered and the form of the solution. To do more than this involves, in essence, restarting the method again from the beginning after the new data have been inserted.

In addition to the Simplex-like methods, some alternative methods known as interior point methods have evolved that have gained some attention since the publication of the Simplex Algorithm by George Dantzig in 1947. For example, Leonid G. Khachiyan in 1979 proposed an ellipsoidal method. And, in 1984, Narendra Karmarkar introduced an interior point method for solving linear equations. See, for example, U.S. Pat. No. 4,744,028 issued to AT&T in the name of Narendra Karmarkar. Other patents related to linear programming include for example, U.S. Pat. No. 5,136,538 to Karmarkar et al. entitled "Preconditioned Conjugate Gradient System"; U.S. Pat. No. 6,078,938 to Pan et al. entitled "Method and System for Solving Linear Systems"; U.S. Pat. No. 6,694,343 to Forrest et al. entitled "Method for Solving a Large Sparse Triangular System of Linear Equations"; U.S. Pat. No. 6,950,844 to Walster et al. entitled "Method and Apparatus for Solving Systems of Linear Inequalities"; and U.S. Pat. No. 7,065,545 to Quintero-de-la-Garza entitled "Computer Methods of Vector Operation for Reducing Computation Time."

Nevertheless, problems involved with computer implementations of methods for solving linear equations remain. For example, as outlined above, the accumulation of computer errors causes a problem. As another example, changing conditions in dynamic problems also cause difficulties.

Thus, there is a need for improvement in the current state of affairs.

SUMMARY

In accordance with one embodiment of the invention, a method of optimizing a linear equation optimality problem subject to a change of conditions can be accomplished. The method can include determining a first set of conditions for the linear equation optimality problem; initiating processing by a computer to optimize the optimality problem in accordance with the first set of conditions; determining a second set of conditions different from the first set of conditions; continuing processing with the computer to optimize the optimality problem by using the second set of conditions without having to re-initialize the computer.

Further embodiments will be apparent from the specification.

BRIEF DESCRIPTION OF THE DRAWINGS

FIG. 1 illustrates a block diagram of a computer that can be used to implement a computerized device in accordance with one embodiment of the invention.

DETAILED DESCRIPTION

I. Overview

This document presents a solution we have developed to address some of the problems that presently occur when a computer is used to attempt to optimize linear equations. For example, we present a solution herein to solve the problem of accumulated computer error caused by a computerized optimization of linear programs. Also, a solution is presented herein to solve the problem of one having to re-start from the beginning in an attempt at optimizing a linear programming problem when one encounters changing conditions for the problem.

In accordance with one embodiment, a method referred to herein as the Virtual Simplex Method (VSM) is introduced. The VSM embeds the given problem in a larger virtual problem and produces a sequence of systems we call virtual problems that contain the original problem and are driven to have the same solution as the original system—even in the presence of computer errors in the computer computations—and it proceeds by pushing the virtual systems in a suitable direction (in a sense we'll discuss later) until we find an equivalent system for which the solution to both the virtual problem and the original problem is made close to exact.

The VSM uses a sequence, $E_1, E_2, E_3, \ldots, E_k$, of what we call E matrices such that $E_i A x = E_i b$. In the VSM, any imprecision in computing an E matrix that comes from computer errors will still produce an invertible factor matrix (the E matrix) that is acceptable in the VSM. That is, the invertibility of the E matrix is all that is required to assure that the original system and the virtual system have the same solution. The VSM can devote its attention to getting a better choice for the E matrix. The choice may be better in either the sense that the E matrix is more nearly an inverse matrix for A or that the value of the objective function is more nearly optimal. As we have implemented VSM these two types of improvements are interspersed. The VSM proceeds, then, by creating a sequence of these invertible factor matrices, $E_1, E_2, E_3, \ldots, E_k$. Each of these matrices $E_i$ could be used to create a problem $E_i A x = E_i b$ which is equivalent to the original problem $A x = b$; that is, they have exactly the same solution set as the original system; however, the VSM never need actually calculate any of the systems $E_i A x = E_i b$, but, instead holds only the factor matrix $E_1$ in registers—we say that the system $E_i A x = E_i b$ is represented virtually by the matrix $E_i$.

The approach of the VSM is to find a way to improve the matrices $E_i$ until the system $E_i A x = E_i b$ can be solved in a straightforward manner by producing a final representation that allows the solution to be read off in an obvious way. When that happens we also have a solution to the original system $A x = b$. The measure of the error still inherent at any point in this process is the measure of the difference between the $E_i$ we have and an exact inverse for A; it is the difference $\Delta = E_i A - I$ (we will discuss this further below). We can calculate this $\Delta_i$ at any time. The VSM has a method to reduce $\Delta_i$ until the error is as small as required.

With this observation the distinction between the VSM and other versions of Simplex-like methods can be made clear: the strategy of the VSM is to create a sequence of factor matrices $E_i$ which come ever-closer, in the sense of minimizing the size of $\Delta = E_i A - I$, to producing an answer which is as close as is needed to the exact solution to the original problem $A x = b$ by being able to read off the solution of $E_i A x = E_i b$. The (imperfectly-achieved) strategy of other Simplex-like methods is to compute a sequence of systems $A_i x = b$, which give approximately-equivalent representations of the original problem throughout the run. Because of the inevitable computer errors in the calculations of the coefficient matrices $A_i$ of these systems, the other Simplex-like methods are always inexact and the errors accumulate as they proceed. They create new systems that are not exactly equivalent to the original problem and for which the errors that are introduced propagate and typically become larger as the run proceeds. The errors in the answers these methods produce are of unknown size, and may even be large enough to invalidate the solution. Furthermore, although these errors can be estimated, they are not reduced during the run of the method. Further background on Simplex-like methods can be found in *Linear Programs and Related Problems* by Evar D. Nering and Albert W. Tucker, Academic Press, Inc. 1993 which is hereby incorporated by reference in its entirety and for all purposes.

The Stored Inverse form of the Revised Simplex Algorithm (SIRSA) (and the related Implied Inverse form of the Revised Simplex Algorithm (IIRSA) in which the sequence of pivot operations required to compute E, rather than E itself are stored) has a technique which is superficially similar to the virtual representation of the problem by the VSM in that the SIRSA holds the factor matrix E in memory and calculates only the parts of EA it needs to make a decision at any point in the method. In that sense, the SIRSA has a virtual copy of the system EAx=Eb in the same way that the VSM does. But there is an important difference in the way SIRSA and the VSM exploit this virtual representation: VSM continually attempts to improve the accuracy of the matrices $E_i$ to create a system $E_iAx=E_ib$ for which $\Delta=E_iA-I$ is minimized by the technique called the Pivot-in-Place (PIP) (see below); the SIRSA does not, and as a result the systems the SIRSA (and other Simplex-like methods) are working on (whether virtually or not) drift away from being completely accurate because of accumulated computer error.

A. Error Control

The original motivations for the Revised Simplex Algorithm and the Stored Inverse Form of the Revised Simplex Algorithm were completely different from the motivation for the Virtual Simplex Method. In the case of the Revised Simplex Algorithm the motivation was to reduce the amount of arithmetic whenever possible and to speed up the execution, by not carrying out multiplications involving a zero entry. In *Linear Programming and Extensions*, page 216-217, published by Princeton University Press, 1998, George B. Dantzig notes that many linear programming problems that occur in practice are sparse, that is, they contain a large number of zeros in the coefficient matrix A. He recommends using the Revised Simplex Algorithm for such problems when the percentage of nonzero entries in A is small (i.e., when A is sparse) and using the standard Simplex Algorithm if the percentage is high (i.e., when there are not many zeros in A). Similarly, the principle motivation for the SIRSA and the IIRSA was to reduce the memory requirements for the computer on which the method is implemented, an idea which was very important when computer memories were smaller, but not so important today. But there is no suggestion in the literature of any other advantage in using these methods. In particular, there is no indication that the idea of using a virtual version of the E matrix, as the VSM does, together with a new notion of error could help control the accumulation of errors in the result.

In general, implementations of all methods employing the standard Simplex Algorithm and its variants, including all forms of the Revised Simplex Algorithm, direct considerable effort to the prevention of the accumulation of computer errors or reduction of the effect of these errors after the fact, but they do so by standard practices in numerical analysis. The strategies for controlling errors in these methods include exploiting the sparseness of the coefficient matrix A when practical and of periodically restarting the calculation from the beginning using a technique like Gaussian Elimination that reduces such errors by using a different (and usually shorter) sequence of pivot operations to get to the same point rather than using the sequence of operations that occurred in the run of Simplex Algorithm itself—essentially a procedure for doing post hoc reduction of the accumulated error by redoing the calculations using a shorter sequence of pivots that will (usually) accumulate fewer errors. In no version of the descriptions of these prior methods is there a suggestion that it is possible to recover from accumulated computer error by any method other than to redo the calculations from the beginning to reduce the number of operations, which, in any event, does not eliminate such errors, but only partially controls them by reducing the number of operations.

By contrast, we have, with the introduction of the Virtual Simplex Method, introduced new and very powerful concepts—the ideas of the Virtual Problem (which we also call the h-Problem), the E Matrix, and the Pivot-in-Place—which handle the control of error in a fundamentally different way, a radically different and more powerful idea. No version of the previous methods based on either the Simplex or any version of the Revised Simplex Algorithm, includes this important concept, which we will describe in detail later.

B. Dynamic Data Changes

There have been many proposals for dealing with changed data in methods based on the Simplex Algorithm after a solution has been obtained. This is called post-optimal analysis or sensitivity analysis. Techniques for doing this are invariably ad hoc with the analysis depending subjectively on the actual numbers encountered and the form of the solution. To do more than this involves, in essence, restarting the method again from the beginning after the new data have been inserted.

By contrast, the Virtual Simplex Method can handle dynamic changes in the data. That means it can not only handle changes in the data after a solution has been found (without restarting the solution process from the beginning), but it can also contend with changes in the data for the problem during the course of the run of the solution process.

In effect, the same ideas that make the Virtual Simplex Method robust with respect to error control permit the VSM to handle changes in the data during the actual run of the method—any differences between the original and subsequent values for the data are treated as if the new data has caused an "error" in the virtual E matrix (the data are different from what they would have been if the new value(s) had been there from the beginning), but the "error" is managed by the same error-correcting provisions of VSM that control the error $\Delta_i=I-E_iA$, so it handles the changing values in A or b without difficulty.

This is a major innovation, particularly when you consider that in some problems the data that are in the original system Ax=b represent a particular state at one instant, only, of a system that is intrinsically dynamic—it might, for instance, represent unstable prices or availability of commodities (e.g., stock prices) that may change very frequently. In other methods, the only real attack that would work in those situations would be to re-run the problem again from the beginning using the new data—so if the solution cannot be found before the data changes, the run is probably worthless. But the Virtual Simplex Method can simply modify the data in the original presentation and continue running—this will frequently result in the VSM finding the solution in many fewer steps and in a shorter time.

The ability to handle dynamically-changing data is an entirely new idea for this class of methods. No other method we know of even attempts to handle this situation, which is significant because many of the actual problems they are asked to solve are inherently dynamic. This leads to a completely new conception of how to use VSM: the method can continue to run even after it has achieved a solution to the original problem; as soon as a price (or other data element) changes, the new data can be entered in the original matrix and the VSM will solve the new problem by starting from the solution of the original problem, a technique that usually produces a solution to the new problem in significantly fewer steps and in a much shorter time. In contrast, previous methods input the changed condition into the original equation and try again to solve it from the beginning.

C. The Virtual Problem (h-Problem)

The Virtual Simplex Method proceeds by first constructing another problem, one we call the Virtual Problem or h-Problem, and then maintaining it continuously as the method proceeds. We call the original problem (i.e., the optimality problem) the f-Problem (with its dual called the g-Problem), and the first and all subsequent h-Problems are related to this original problem. The h-Problem is constructed so that it encapsulates the f-Problem (the f-Problem is embedded or nested inside the h-Problem) in a way that allows the VSM to work on the h-Problem and the f-Problem simultaneously.

An h-Problem is feasible by construction, so there is an evident relationship between what is called Phase I of versions of the Simplex Algorithm, which works on what is usually called the feasibility or auxiliary problem, and the initial h-Problem that we define in the VSM. Again, however, this resemblance is superficial since the purpose and use of the h-Problem are very different from the purpose and use of the feasibility problem of Phase I implementations. The Simplex Method is usually considered to consist of two applications of the Simplex Algorithm, one to find a feasible solution in Phase I and the other to find an optimal solution in Phase II starting from the feasible solution provided by Phase I. After Phase I is completed in the Simplex Method, the Phase I problem is permanently discarded—it is used exclusively to reach a feasible representation (if there is one) which is (approximately) equivalent to the original problem. All previous versions of the Simplex Method then proceed with Phase II, which is designed to preserve feasibility, until they arrive at an answer which is approximately a solution or at an indication that the problem is unbounded.

By contrast, the Virtual Simplex Method has only one phase, retains and exploits the Virtual Problem, the h-Problem, during the entire run toward a solution, and can work on both the h-Problem and the f-Problem at the same time and with the same selection rules throughout the entire method. In particular, it can proceed by working back and forth between the two problems, in many instances adding new variables to the h-Problem which are created within the VSM as needed during the course of a run for the purpose of preserving feasibility of the h-Problem while controlling errors or handling edited (dynamically changed) data. The h-Problem is created at the beginning of a run and it is initialized to be in basic feasible form. It remains in existence throughout a run of the VSM and it is maintained in basic feasible form. If all basic variables of the h-Problem are also basic variables of the f-Problem then the f-Problem also has a basic feasible solution. But whenever a variable is added to the h-Problem it is added as a basic variable and the basic solution of the h-Problem is no longer a basic solution of the f-Problem. When the VSM terminates, if the h-Problem still has basic variables that are not variables of the f-Problem, then the f-Problem is infeasible. If all basic variables of the h-Problem are also basic variables of the f-Problem, then the f-Problem is feasible and optimal. Termination is usually achieved in fewer steps than the two phase approach of other Simplex-like methods.

The h-Problems in the Virtual Simplex Method are always feasible and they provide a controlled expansion space for the f-Problem in which the method operates. Whenever there is any possibility that an operation might be destabilizing to the precision of the calculations or the data might have changed, the VSM introduces new variables to protect the integrity of the data the method sees while proceeding toward a solution, preserving the ability to return to a feasible form for the f-Problem as it does so. This innovation, which provides a means for robust error-control and dynamically-changing data while preserving the ability to find a feasible form for the f-Problem continuously, is completely unanticipated in the literature of the subject.

h-Problems are created at the beginning of the run using what we call the ForceNonNegative, the ForceNonBasic, and the ForceNonZero operations; the first two of these operations, when applied to the original problem, produce what is usually called the feasibility problem in Phase I of Simplex-like methods as the first h-Problem. But in VSM, additional h-Problems may be created or modified during the course of the run. The ForceNonBasic operation is used to create an h-Problem during a run of the method as part of the important Pivot-in-Place operation which controls the $\Delta$ error and prevents the accumulation of computer error in the virtual problem (and about which we say more later); ForceNonBasic is also used whenever the original data of the problem have been modified. There is another novel operation called ForceNonZero which is used to control cycling and stalling during the course of the method by inducing a controlled perturbation of the problem in a way that is similar to the original Simplex Algorithm; however, ForceNonZero does this uniquely by using a pivot operation that creates or modifies an h-Problem.

D. New Measure of Error

One of the key theorems of linear algebra is that if one linear system can be generated from another by a sequence of elementary row operations, then the two systems have identical solution sets. This theorem is exploited by all versions of methods based on the Simplex Algorithm to solve linear programming problems. The common step of Simplex-like methods, the pivot operation, is equivalent to a sequence of elementary row operations. So if the arithmetic used to calculate the sequence of linear systems arrived at in the course of finding the answer in the implementation and execution of one of these Simplex-like methods is exact, these methods produce an answer which is an exact solution. In practice, however, the arithmetic is almost never exact because the calculations are carried out on a digital computer and they inevitably have some computer error which is incorporated into the answer so that it is only an approximation to the desired exact solution. To distinguish these two concepts, the word answer instead of solution will be used to mean the result arrived at by the method in order to emphasize the point being made in this section. If the calculations in the execution of Simplex-like methods were exact, an answer produced by these methods would be an (exact) solution; because of computer error, however, the answer may not be a solution, and usually the answer is not a solution.

This introduces a difficult problem for Simplex-like methods: they never know how far they have strayed from not only an exact solution, but even from a useful result. This difficulty is not much addressed in the theory of the subject because, in the development of the mathematical theory of the subject, the calculations are always assumed to be exact. Whatever attention has been paid to the accumulation of computer error has usually been in the application of standard numerical techniques after the answer prescribed by the method, which is only an approximation to the exact solution, has been found—these typically involve recalculating the answer in a way that (usually) creates less computer error and is, therefore, likely to be closer to the exact solution. And the situation can be even worse than this—sometimes the accumulation of computer error actually prevents finding a legitimate result at all, even as an approximation to the real solution, by presenting an answer that is explicitly wrong in type—by giving an optimum when there is not one, or by saying there is not one when there is one. If a run a Simplex-like algorithm encounters a basic solution for which the columns are the columns of an ill-conditioned matrix, the errors introduced will contaminate the subsequent calculations. The remedy in those cases is to recalculate using a sequence of steps that will avoid the ill-conditioned matrix. Furthermore, even with the application of these recalculation techniques, the answer presented by these methods is still not an exact solution and the difference between an exact solution and the answer the method provides is unknown.

The problem is that in order to control computational errors one needs a definition of what the error is. Error is the deviation of a computed result from an ideal exact result. Since the error as conceived in the earlier versions of the Simplex-type methods is the deviation of a computed result—the (approximate) answer derived by the sequence of steps in the method—from the ideal result—the exact solution—in order to assess the error one would have to know what that exact solution is, but in most cases the exact solution is unknown (that is, after all, the reason for doing the problem), so that one can only estimate the error after the fact.

The Virtual Simplex Method takes a very different approach by defining a new notion of the error to be controlled. In standard Simplex-like approaches, the idea is to start with a linear system:

$$Ax=b$$

and find the exact inverse, $A^{-1}$ for A to obtain an exact solution, b', to the original system by:

$$x=Ix=(A^{-1}A)x=(A^{-1})(Ax)=(A^{-1})b=b'$$

(In the equation above, we intend that the variables that are nonbasic in $(A^{-1})(Ax)=(A^{-1})b$ are simply dropped; we could make this explicit, but it would be at the expense of clarity here—so we adopt the notational convention of writing A when we mean the matrix which remains when we drop the columns of A that are associated with nonbasic variables. The systems are still equivalent.) However, because of the computer error usually present at each step as the calculations in the method are carried out, the factor matrix these methods produce is an inexact approximation, E, to the left inverse, $A_t^{-1}$, of A rather than an exact $A_t^{-1}$ and the result is:

$$\tilde{I}x \approx (EA)x = E(Ax) = Eb \approx \tilde{b}'$$

Where $\tilde{I} \approx EA$ is an approximation to I and $Eb \approx \tilde{b}'$ is an approximation to b', with the errors in the approximations due to imprecision of the calculations from computer errors. How close is the approximation $\tilde{b}'$ to the exact solution b'? There is no obvious way to know; calculating that error is equivalent to knowing $(E-A_t^{-1})$:

$$\tilde{b}'-b'=(EA)x-(A_t^{-1}A)x=(E-A_t^{-1})Ax$$

But we don't know $A_t^{-1}$; it is, in fact, what we're looking for.

By contrast, the Virtual Simplex Method proceeds by accepting whatever E matrix is calculated (as long as it's invertible, which is the only condition we need We regard any invertible E matrix as always perfectly accurate, regardless of where it came from. Whatever values the computations produce for the entries of E, even if there are computer errors in the calculations, are acceptable to the VSM—computer errors just lead to an answer for the problem which is temporarily different from an exact solution (the result we want eventually). We accept E as having no numerical error in it, because instead of the usual definition of error (the difference between Eb, calculated using an inexact E that was computed subject to accumulation of computer errors, and the exact solution b'), we define the error Δ in the VSM at any moment to be the difference between I and EA, both of which are known:

$$\Delta = I - EA$$

This is an important, but subtle difference in the concept of the error remaining in the problem for three reasons: a) Δ can be calculated directly; b) Δ can be made small, as we will describe later; and c) we can make A smaller using only operations that are computationally efficient and are already part of the VSM. It is an appropriate notion of error because a solution to the system EAx=Eb is a solution to the original system Ax=b as long as E is invertible—no matter what E is or where it came from—and in particular, regardless of whether it was produced with calculations that were subject to computer error or were exact. That means, in particular, that an exact solution of either system is an exact solution of the other—we haven't lost any precision at all in the solution to these systems by the introduction of an invertible E.

This formulation of the notion of error avails nothing of value unless we can guarantee three conditions:

i) there is a way to determine the relation between this new definition of error as Δ=I−EA and the traditional definition of error Eb−b';

ii) there is a way to use this new definition of error to reduce the error in an answer to the linear programming problem;

iii) there is a practical method to reduce this new error, that is, there is a way to control the error which is computationally efficient.

The Virtual Simplex Method provides exactly these capabilities.

The Relationship Between the New Δ Notion of Error and the Original Notion of Error in Simplex-Like Methods The two notions of error are simply related. If $A^{-1}$ is an exact inverse of A and $\bar{b}=A^{-1}b$, then $A\bar{b}=AA^{-1}b=b$ and $\bar{b}$ is an exact solution. If E is an approximate inverse, EA=I+Δ, and b'=Eb then $$b'-\bar{b}=Eb-A^{-1}b=(E-A^{-1})b=(E-A^{-1})A\bar{b}=(EA-I)\bar{b}=\Delta\bar{b}$$

That is, if Δ is small then the answer b' is a close approximation of the exact solution $\bar{b}$.

Since $\bar{b}$ is not known we cannot compute the error directly. But since b' can be computed and, since it is a good approximation of $\bar{b}$, Δb' is a good approximation of the error. Thus any steps that reduce the size of Δ will be effective in improving the accuracy of these approximations to a solution.

The Reduction of the a Error in the VSM

With this new definition of the error, we can devise steps to control or reduce it. We take the position that E is not in error, it is just not necessarily the best choice for an inverse. That is, we try to improve E. One approach is to replace E by (I−Δ)E since $[(I-\Delta)E]A=(I-\Delta)(EA)=(I-\Delta)(I+\Delta)=I-\Delta^2$. That is, (I−Δ)E is a better inverse than E was in the sense that the Δ error is smaller. As appealing as this approach is, it is not effective in practice because it is computationally expensive and therefore unsound. By attacking Δ one column at a time, however, we are able to devise a method that is effective, fast and simple to implement.

Controlling the a Error in the VSM: the Pivot-in-Place Procedure

The VSM uses a technique that is unanticipated in any other method for controlling the error Δ. We call the method the Pivot-in-Place, or PIP. To say that the PIP is a new idea is an understatement—not only does it not appear in any other method for solving linear systems, it is actually expressly forbidden by all other methods either explicitly or implicitly (in the implicit case by disallowing the columns in which PIPs occur from being candidates for pivot operations).

A PIP is a pivot operation in the column of a Basic Variable. Such a column would be a unit column if all calculations were exact and not subject to computer error, that is, it would have a single 1 in some row and all other entries would be 0s, and the pivot would occur in the row of the 1. Such a pivot would do nothing at all—there would be no change in the matrix, and the variables exchanged would be the same variable, so there would be no change in the Basic Variable set. Because of this fact, all other Simplex-like methods prohibit a pivot in the column of a Basic Variable and view it as adding unnecessary computations that increase computation time. They do this by simply skipping Basic columns.

However, because the arithmetic is inexact in calculations on a computer due to computer errors, a PIP actually does have an effect, and it's a very beneficial one—it works to keep computer errors from accumulating in the factor matrix E which represents the virtual problem EAx=Eb by constantly repairing errors in the calculation of E. Because the error in E can be controlled using PIPs in this way, the virtual problem in the VSM, unlike in the SIRSA, is very robust and does not accumulate a large amount of computer error.

If $\Delta$ is an m×m matrix whose entries $\delta_{ij}$ are all small (think of $\Delta$ as being the error at a point in the run of VSM), let $\Delta_k$ be the m×m matrix which is 0 everywhere except that the $k^{th}$ column of $\Delta_k$ is the column of $\Delta$, so that $$\Delta = \sum_{k=1}^{m} \Delta_k$$

Since the $\delta_{ij}$ are small, we have also that $$(I - \Delta) \cong \prod_{k=1}^{m} (I - \Delta_k)$$

(The difference between $$\prod_{k=1}^{m} (I - \Delta_k)$$

and $(I-\Delta)$ consists of some terms that are sums of products of entries in the $\Delta_k$ matrices, which are all small).
Therefore, we have that $$(I - \Delta)E \cong \left\{\prod_{k=1}^{m} (I - \Delta_k)\right\} E$$

So we can approximate $(I--\Delta)E$ by calculating $$E_1 = (I-\Delta_1)E$$

and $$E_i = (I-\Delta)E_{(i-1)}$$

for i>1 so that $$E_m = \left\{\prod_{k=1}^{m} (I - \Delta_k)\right\} E \cong (I - \Delta)E$$

What this shows is that m consecutive multiplications of the original E matrix by the terms $(I-\Delta_k)$ produce a matrix that approximates an improved factor matrix $(I-\Delta)E$. One important observation here is that the order of the factors in $$\prod_{k=1}^{m} (I - \Delta_k)$$

does not matter. The results differ in quantities that are of the order of magnitude of $\Delta^2$. For the same reason it is not necessary to do all the multiplications at the same time—we can do them one column at a time, in any order we choose.

The other important observation is that multiplication by $(I-\Delta_k)$ is approximately the same as performing a pivot operation. The difference is that a multiplication by $(I-\Delta_k)$ multiplies row k by $(1-\delta_{kk})$ and a pivot operation divides the row by $(1+\delta_{kk})$. The results differ by terms in the order of magnitude $\delta_{kk}^2$. We call this operation a PIP.

This analysis shows that carrying out PIPs as they occur in the VSM is approximately equivalent to continuously multiplying the existing factor matrix E by $(I-\Delta)$, which tries to reduce the error term $\Delta$ continuously.

E. The Autonomous Synchronous Computer

The VSM can utilize special purpose hardware, a computing configuration we call the Autonomous Synchronous Computer (ASC). This computer is designed to have self-indexed registers that cannot be addressed and do not have any RAM. They are autonomous in the sense that they contain their own instructions and their own data. They are synchronous in the sense that they operate at the same time, one method at a time, the same method for all. They communicate with the outside world only by reading from and writing to a small amount of commonly available memory which we call a Cache. The controlling program, which we call the Conductor, passes the constraint coefficients to the registers one column at a time. It receives in return just enough information to apply VSM's selection rules for pivot exchanges. The principal task of each register is to update the entries in its row, but the values of these entries are not needed by the Conductor and they are not passed to the Conductor. The number of methods used by the registers is small and they are all simple.

Although this computer comprises many processors computing simultaneously, it is not a traditional parallel computer. The metaphor for a parallel computer is to think of a sales office in which the manager gives the salesmen instructions for the day, after which they go about their business independently of each other and report back to the manager at the end of the day. By contrast, the metaphor that's appropriate for the ASC is that of a symphony orchestra in which each player has his own music and the musicians play synchronously under the direction of the conductor. Each component carries out certain tasks on timing cues that it gets from the Conductor. In the ASC, the data of the E matrix is contained in a series of indexed registers in the processors. Each processor is responsible for one row of the matrix. At each timing beat they all simultaneously update the row they are responsible for.

At no time does any processor know what is in any of the registers of the other processors. The processors are, in this sense, autonomous. The ASC may comprise an array of processors which have a very small instruction set and operate entirely out of registers associated with the processor. They need not be considered computers; they need not be addressable; and, they need not have any memory beyond the registers. The outside world need not know where they are located. They run on their own, even seeking out on their own the information about which of their limited number of instructions they should carry out at any given time. An important factor to their autonomy is that they may be self indexed; they do not have to be addressed. The Conductor does not have to know where they are. Each has an ID field that it uses to identity itself. The Conductor may put information into a cache and each processor compares its ID with a RowID in the cache to determine what actions it should take.

The ASC hardware is designed to carry out the Virtual Simplex Method. Because it is designed to do the VSM, it is very fast. Thus, as one can see:

VSM is accurate because of its PIP.

VSM is flexible because of its PIP.

VSM is robust because of its use of PIP and the h-Problem.

VSM can be run continuously in a dynamic environment because its use of PIP and the h-Problem and the fact that it has only one phase.

VSM is simple to implement because it is a one-phase method.

VSM is fast because it works on the optimality problem and the h-Problem at the same time and uses fewer iterations.

The h-Problem creates an environment in which it is possible to introduce the operations ForceNonBasic, ForceNonNegative and ForceNonZero for special purposes.

II. Mathematical Foundation

The mathematical foundation will now be discussed in more detail.

A. Linear Programs

Since systems of linear equations and linear inequalities are special forms of linear programs we start with linear programs. We want to maximize the objective function $$f=cx+d \quad (1)$$

where $$Ax \leq b \quad (2)$$

subject to the condition that $x \geq 0$.

We convert this formulation to a system of equations in the form $$Ax+y=b \quad (3)$$

by imposing the condition that $y \geq 0$. This form, with $x \geq 0$ and $y \geq 0$, we call a canonical linear program. We say that the variables x and y satisfying these inequalities are canonical variables. We divide consideration of solving this problem into two steps. We can assign any values we please to x and solve for $y=Ax+b$. Among the possible solutions a solution that also satisfies the conditions $x \geq 0$ and $y \geq 0$ is called a feasible solution. We first try to find a solution that is feasible. If the system of equations has a feasible solution the system is said to be feasible. If the problem is feasible we then try to find a feasible solution that maximizes f. The linear program can fail to have an optimal solution in two ways, the equations may have no feasible solution or the system may be feasible but the set of feasible values off is unbounded.

For every linear program in this form there is a closely associated dual problem to minimize $$g=vb+d \quad (4)$$

subject to the condition $$vA-u=c \quad (5)$$

where $u \geq 0$ and $v \geq 0$.

The relation $$g-f=vb-cx=v(Ax+y)-(vA-u)x=ux+vy \quad (6)$$

is called the duality equation. Since $ux+vy \geq 0$ for canonical variables this implies that $$f \leq g \quad (7)$$

and that max $f \leq$ min g.

The formulation of the duality equation and its consequences are given in detail in *Linear Programs and Related Problems* by Evar D. Nering and Albert W. Tucker, Academic Press, 1993, [LPRP]. The theorems and facts quoted in the following exposition are explained and proved there.

If a linear program and its dual problem are both feasible then both problems have optimal solutions and their optimal values are equal. If one problem is feasible and the other is not, the feasible problem is unbounded. The duality equation is true under all conditions but the conclusions about optimality depend on the inequality $ux+vy \geq 0$.

This suggests that we can preserve the conclusions about optimality by relaxing the feasibility constraints as long as we preserve the inequality. We define a variable to be free if no constraint is placed on it and we define a variable to be artificial if it is required to be zero. We say that two variables paired in the duality equation satisfy dual feasibility specifications if both are canonical or that if one is free its dual is artificial. In this way we generalize the statements about optimality to any pair of dual problems for which dual variables satisfy dual feasibility specifications.

An ordinary system of linear equations can be cast in this form by taking c=0 and requiring y to be artificial and letting x be free. In our terminology the system always has a solution. The question is whether it has a feasible solution. Then dual feasibility specifications would require that u be artificial and v be free. The dual system vA=u is always feasible since we can take v=0 no matter what the feasibility specifications are. The system Ax=b for x free has a solution if and only if the system vA=0 and g=vb is bounded. In traditional linear algebra we show that a system of linear equations fails to have a solution by using a method that fails to find a solution. In this context we can show that the system fails to have a solution by showing that the dual system is unbounded. But since the duality equation would imply that f=g for dual optimal solutions and f=0 it is sufficient to show that g>0 for a feasible solution. This gives us a positive criterion for a negative conclusion.

The relation between a dual pair of problems is symmetric. Either can be taken as the primal problem and the other as its dual. We will consistently take the maximization problem as the primal problem. The method we describe will terminate if it shows that the primal problem is unbounded. If the primal problem is feasible the method will try to find a feasible solution for the dual problem. If it finds such a solution for which f=g with f and g both feasible it will have obtained an optimal solution.

B. Linear Systems

To provide the notation and terminology for the method we will cast the linear program in the form of a single system of equations which we call a linear system. Write the equation f=cx+d in the form $$(-d)(-1)+(-f)+0y+cx=0 \quad (8)$$

and the equation Ax+y=b in the form $$b(-1)+0(-f)+Iy+Ax=0 \quad (9)$$

We can now combine all this into a single matrix equation with the coefficient matrix $$\begin{matrix} -1 & -f & y & x \\ \begin{pmatrix} -d & 1 & 0 & c \\ b & 0 & I & A \end{pmatrix} = 0 \end{matrix} \quad (10)$$

The equations (8) and (9) are implied by retaining the matrix in (10) and remembering the entries that are on the top border. The notation can be further simplified by combining the first column containing −d and b into a single column that we denote by b, combining the next two columns into a single column that we denote by I and combining the last column into a single column we denote by A. In that notation equation (10) takes the form $$-1)x$$

$$(bIA)=0 \tag{11}$$

If the original equation had m rows indexed from 1 to m the matrix we now have has m+1 rows indexed from 0 to m. We merely have to remember that row 0 represents the objective function and that $f=-y_0$. For that reason we call that row the objective row.

Since each $y_i$ appears in only one equation with the coefficient 1 it is easy to find solutions. Assign any values you wish to the $x_j$'s and compute the $y_i$'s. Among such solutions the easiest to obtain is to assign x=0. In that case each $y_i=b_i$ and f=d.

It is not difficult to find other solutions. In any column not a unit column look for an entry $a_{ij}$ that is non zero. Divide that row by $a_{ij}$ to make that entry 1. Then subtract multiples of that row from the other rows to make the other entries in that column zero. That column will become a unit column and the column that had a 1 in that row will no longer be a unit column. We can again assign 0 to all the variables corresponding to columns other that the unit columns and compute the values of the variables corresponding to the unit columns.

The operation described in the previous paragraph is called a pivot operation. The column chosen is called the pivot column. The row chosen is called the pivot row.

The unit columns are called basic columns and variables associated with basic columns are called basic variables. A solution obtained by assigning zeros to the non basic variables is called a basic solution. When a pivot operation is performed one variable that was non basic becomes basic and one variable that was basic becomes non basic. For this reason a pivot operation is also called a pivot exchange.

The importance of this concept is contained in the following three theorems.

If a linear system has a feasible solution it has a basic feasible solution.

If a linear system has an optimal solution it has a basic solution that is optimal.

We can get from one basic solution to any other basic solution by a sequence of pivot exchanges.

Thus, it is possible to design a method to find feasible solutions and to find optimal solutions by sorting through the basic solutions.

C. Basic Solutions

The dual problem also has basic and non basic variables, though that is not obvious from the way we have represented linear systems. We have chosen to represent a linear system with a matrix in expression (11) because it is best for the computations we will describe but it does not show the symmetry between the primal and dual problems. The Tucker tableau, described in LPRP, displays the symmetry effectively. Here, we will be content to describe how to find the basic and non basic variables and their values from the representation (11).

The duality equation combines pairs of variables from the primal and dual problems. In each pair one variable is basic for its problem and its dual is non basic for its problem. The variables for the dual problem will never be displayed in any representation we use. They are implied. The variable of the primal problem associated with a basic column is basic for the primal problem. Its implied dual variable is non basic. A variable of the primal problem associated with a non basic column is non basic and its implied dual variable is basic. For a basic solution we assign zero to all non basic variables for both the primal problem and the dual problem. Each basic variable for the primal problem is associated with a basic column, and that column has a one in only one row. We therefore associate each basic variable with a row of the representation. The entry in that row of the b column is the value of that basic variable.

Let us illustrate this with an example. Consider the linear program: Maximize $$f=10x_1+5x_2+5.5x_3+20 \tag{12}$$

where $$\begin{aligned} 30x_1 &+10x_2 &+50x_3 &\leq 1500 \\ 5x_1 & &+3x_3 &\leq 200 \\ 2x_1 &+x_2 &+3x_3 &\leq 12 \end{aligned} \tag{13}$$

When cast as a linear system it is represented by the matrix $$\begin{bmatrix} -20 & 1 & 0 & 0 & 0 & 10 & 5 & 5.5 \\ 1500 & 0 & 1 & 0 & 0 & 30 & 10 & 50 \\ 200 & 0 & 0 & 1 & 0 & 5 & 0 & 3 \\ 12 & 0 & 0 & 0 & 1 & 2 & 1 & 3 \end{bmatrix} \tag{14}$$

After several pivot exchanges we might obtain $$\begin{bmatrix} -620 & 1 & 0 & 0 & -5 & 0 & 0 & -19.5 \\ 60 & 0 & -0.2 & 0 & 3 & 0 & 1 & 5 \\ 30 & 0 & 0.1 & 0 & -1 & 1 & 0 & 0 \\ 50 & 0 & -0.5 & 1 & 5 & 0 & 0 & 3 \end{bmatrix} \tag{15}$$

The basic columns determine the values of their basic variables. We get $x_2=60$, $x_1=30$, and $y_2=50$.

Each non basic variable for the primal problem is associated with a non basic column. By implication, the basic variable of the dual problem is also associated with that column. Its value is the negative of the entry in the objective row of that column. This gives the variable dual to $y_1$ the value 0, the variable dual to $y_3$ the value 5, and the variable dual to $x_3$ the value 19.5. We will display these results in a table of the form

|  | f = g | y1 | y2 | y3 | x1 | x2 | x3 |  |
|---|---|---|---|---|---|---|---|---|
| primal | 620 |  | 50 |  | 30 | 60 |  | (16) |
| dual | 620 | 0 |  | 5 |  |  | 19.5 |  |

From the duality equation we see that g−f=ux+vy=0 since one or the other of each dual pair is non basic and, therefore, zero. In this case we have f=g=620.

D. Virtual Linear Systems

Consider the linear system $$-b+Iy+Ax=0 \tag{17}$$

If we multiply on the left by the invertible matrix E we obtain the linear system $$(-E)b+Ey+EAx=0 \tag{18}$$

Most algebraic methods for solving linear equations start with a system in the form Ax=b and generate a sequence of equivalent systems $A_1x=b_1, A_2x=b_2, \ldots, A_kx=b_k$ until a system is obtained for which the solution is obvious. When these calculations are done by hand using rational arithmetic it is conceptually possible to keep these systems equivalent so that the solution of the last system is also a solution of the initial system. When these calculation are performed on a computer slight round off errors occur so that the systems are no longer exactly equivalent. An extensive literature exists dealing with these errors and many methods are available for minimizing the effects of these errors and estimating their size. We will take a very different approach. We will store the initial coefficient matrix A and generate a sequence of factor matrices, $I, E_1, E_1, \ldots, E_k$. We will store only the initial A and the current $E_k$. At any time we can use equation (18) to generate the equivalent system or any part of it that we wish. The system (18) exists only virtually.

The matrix for the initial system (17) has an embedded identity matrix. Its columns are unit columns, a column of zeros with one entry equal to 1. Each pivot exchange selects a non basic column for a new basic column and drops a column that was basic. After each pivot exchange we again have m+1 unit columns. They can be rearranged to constitute an identity matrix. If the same columns of the original matrix are selected and rearranged in the same way they would constitute a submatrix C for which E would be its inverse. Traditional implementations of the simplex algorithm take b'=Eb as the basic solution under the assumption that EC=I.

When the operations in (18) are carried out on a computer the two linear systems are not exactly equivalent. That is, they do not have exactly identical solution sets. As long as the implied arithmetic operations are not carried out and the matrix E is invertible, the two linear systems have identical solution sets. Round off errors can accumulate in E. Our position is that as long as E is invertible we may not have the right E but we do not have errors. The questions are: how do we measure how close the current E is to being correct and how do we find a better choice for E if we do not have the correct one?

To answer this question we look for a way to measure how far off our choice is. After each pivot exchange we have basic columns equal in number to the number of rows. That is, by rearranging the order of the columns the matrix contains a unit matrix. By rearranging the columns of the original representation of the linear system we can identify a submatrix B for which EB=I. If we have a close candidate for the inverse of B this calculation will give us something in the form of $$EB = I + \Delta \tag{19}$$

where $\Delta$ is a matrix with small entries. We use the size of the entries in $\Delta$ as a measure of how good E is as a choice. How can this choice be improved?

Calculate $$(I-\Delta)(EB) = I - \Delta^2 \tag{20}$$

If the entries in $\Delta$ are small the entries in $\Delta^2$ are even smaller. That is, $(I-\Delta)E$ is a better choice for an E.

There are several objections to taking this route. The calculation of EB=I+$\Delta$ is a matrix multiplication that requires approximately $m^3$ arithmetic multiplications. Then the calculation of $(I-\Delta)E$ requires $m^3$ more. This compares unfavorably with the $m^3/3$ multiplications required to do Gaussian elimination. Also, the process requires that we compute both EB and $(I-\Delta)E$. That is, even if a small improvement is desired, once started the whole process must be completed. Furthermore, for computer calculations matrix multiplications are not associative and the accuracy of I–$\Delta^2$ is achievable as $(I-\Delta)(EB)$ but not as $((I-\Delta)E)B$. For us, the most important objection is that these operations do not fit comfortably into the method we propose. Fortunately, there are satisfactory answers to these concerns.

E. Pivot in Place

There is a better way. Let $\Delta_k$ be an m×m matrix with all zeros except that column k of $\Delta_k$ is column k of $\Delta$. Then $$\sum_{k=1}^{m} \Delta_k = \Delta \text{ and} \tag{21}$$

$$\prod_{k=1}^{m} (I - \Delta_k) \approx I - \Delta \tag{22}$$

If we compute the product $(I-\Delta_k)E$ we obtain the new column j of E, $$C_{kj}^1 = (1-\delta_{kk})e_{kj} \tag{23}$$

and $$c_{ij}^1 = e_{ij} - \delta_{ik}e_{kj}, i \neq k \tag{24}$$

Now let us compute column j of E after a pivot in place. The pivot column is identical to column k of I+$\Delta_k$. That is, $p_k=1+\delta_{kk}$ and $p_i=\delta_{ik}$ for i≠k. When we do a pivot in place the new column j is $$e''_{kj} = e_{kj}/(1+\delta_{kk}) \approx e_{kj}(1-\delta_{kk}) = c'_{ki} \tag{25}$$

$$e''_{ij} = e_{ij} - \delta_{ik}e_{kj}/(1+\delta_{kk}) \approx e_{ij} - \delta_{ik}e_{kj}(1-\delta_{kk}) = c'_{ij} - e_{kj}\delta_{ik}\delta_{kk},$$
$$i \neq k \tag{26}$$

This shows that multiplication by $(I-\Delta_k)$ and doing a pivot in place produce approximately the same results.

We can make an estimate for the error in the solution. If $\overline{E}$ is the exact inverse of A and $\overline{b}=\overline{E}b$, then $A\overline{b}=b$ and $\overline{b}$ is an exact solution. If E' is an approximate inverse and b'=E'b then $$b' - \overline{b} = E'b - \overline{E}b = (E' - \overline{E})b = (E' - \overline{E})A\overline{b} = \Delta\overline{b} \tag{27}$$

This gives a theoretical bound for the accuracy of the solution. The usefulness of this estimate is limited by the precision with which the $\Delta$ is computed.

F. The Method

Here we give a short outline that will serve to make the method more understandable.

Starting with I we apply the pivot operations described in the previous sections only to I and its successors. In this way we produce a sequence of invertible matrices $I, E_1, E_2, \ldots$ We do not compute any part of $E_kA$ unless we need to obtain a particular element in it. The $E_kA$ is a virtual matrix. In particular, the submatrix I+$\Delta$ is not computed. We compute a column of $E_kA$ if we need the column as a potential pivot column, but the row operations of the pivot exchange are applied only to the current $E_k$ to produce the next $E_{k+1}$.

III. The Autonomous Synchronous Computer

With the goal of implementing a linear programming method that is fast and accurate the design of the method must be based on considerations of what information is needed at any time, how it is to be used, where this information should be stored, and how to move it from one place to another. By casting the problem in virtual form one realizes that the coefficient matrix, or E matrix, is all that must be stored to provide information about the current status of the computation. This data must be stored in hardware and we decided to organize this storage in the form of a collection of rows of the E matrix.

All the entries in the virtual A matrix can be calculated when needed. We need to calculate only one column of the virtual A matrix at any time. Previously calculated columns do not have to be saved. Furthermore, a computer needs only enough information to select an eligible pivot column and an eligible pivot row, or to decide that the currently examined column is not eligible. For this reason the E matrix does not have to be visible to the outside world. In computer terminology, the E matrix does not have to be addressable. All that the computer must be able to do is to make information needed by the E matrix available, and to read information returned from the E matrix when it is needed.

This information can be passed between the Conductor and the E matrix through a set of data fields that is accessible to both. A drop box used in espionage is analogous. An agent can communicate with his control by leaving messages in the drop box and picking up messages addressed to him. No agent need know anything about any other. This message area is called the ECache.

A. The EMatrix

We use the term EMatrix to refer to the hardware implementation of the E matrix. It consists of a collection of objects called ERows. Each represents one row of the E matrix. Each is an object in the sense of object oriented programming. That is, each has a few data fields and a few methods that are used to deal with the data fields. The methods are implemented in firmware so that the ERows can run their methods simultaneously. The ERows are to be placed on a single chip, e.g., as many ERows as there is room for.

The following listing shows the fields that are in each ERow.

```
TERow=class (TObject)
   ID: integer;
   Row: TRow;
   ppp: extended;
   rrr: extended;
   Epsilon: real;
   procedure Action;
end;
```

Notice that there is just one procedure. At a signal from the Conductor all ERows run this one procedure. This signal is called a trigger. At each trigger the ERows run their method once. The Conductor issues a sequence of triggers. Much like the conductor of a symphony orchestra issuing a sequence of downbeats this sequence of triggers keeps the ERows in synchrony.

The Action procedure has sub methods each identified by a method index, MethodID. Before issuing the signal for the ERows to run the Conductor writes the MethodID into ECache. When the procedure runs it branches to the sub method identified by MethodID. The sub methods fall into three types. The sub method in all ERows do the same thing, the sub method in one ERow does something and the others do nothing, or the sub method in one ERow does nothing and the others do the same thing. If one ERow is singled out in this way the Conductor identifies it by writing its ID into RowID of the ECache.

The ERows are identical except for the ID field which is set at the time the chip is fabricated. Since the ERows cannot be addressed each has to know how to identify itself. By looking into ECache each ERow determines for itself what it is to do, which of its sub methods to run and whether it is the distinguished ERow or not. It is not told what to do.

Below is a listing of the Action procedure in an object oriented language, Object Pascal. This is to make it intelligible to humans. This procedure will not be implemented in any high level language in the intended firmware. The procedure will be implemented in the most efficient and appropriate way that will perform the actions intended.

Notice that the variables used in the methods are all either registers within the ERow itself or fields in ECache. The methods do not use RAM. All addresses of variables can be hard-wired into the firmware program.

```
procedure TERow.Action;
var
   i : integer;
begin
   case ECache.MethodID of
   1:    begin // Initialize
            for i := 0 to MaxRow do
               Row [i] := 0;
            if ID > = 0 then
               Row [ID] := 1;
            Epsilon := ECache.Epsilon;
         end;
   2:    begin // GetERow
            if ID = ECache.RowID then
               Row := ECache.ERow;
         end;
   3:    begin // PutERow
            if ID = ECache.RowID then
               ECache.ERow := Row;
         end;
   4:    begin // GetPivotColumn
            ppp := ECache.EColumn [ID];
         end;
   5:    begin // GetPivotColumnInE
            ppp := Row [ECache.PivColumnInE];
         end;
   6:    begin // Computebbb
            Row [-1] := 0;
            for i := 0 to MaxRow do
               Row [-1] := Row [-1] + ECache.BColumn [i] *Row [i];
         end;
   7:    begin // Computeppp
            ppp := 0;
            for i := 0 to MaxRow do
               ppp := ppp + ECache.AColumn [i] *Row [i];
            if ID = -1 then ECache.HCoefficient := ppp;
            if ID = 0 then ECache.FCoefficient := ppp;
         end;
   8:    begin //Computerrr;
            if (ppp > Epsilon) and (ID > 0) then rrr := Row [-1]/ppp
               else rrr := -1;
            ECache.RColumn [ID] := rrr;
         end;
   9:    begin // NewPivotRow;
            with ECache do
               if ID = RowID then
                  begin
                     for i := -1 to MaxRow do
                        Row [i] := Row [i] /ppp;
                     ERow := Row;
                  end;
         end;
   10:   begin // NewOtherRow;
            with ECache do
               if ID < > RowID then
                  for i := -1 to MaxRow do
                     begin
                        Row [i] := Row [ i] - ppp*ECache.ERow[i];
                        if (Row [i] > -Epsilon) and
                        (Row [i] < Epsilon) then Row [i] := 0;
                     end;
            if ID = -1 then ECache.Infeasibility := Row [-1];
         end;
   11:   begin // Compute -rrr
            if (ppp < 0) and (ID > 0) then rrr := -Row [-1] /ppp
               else rrr := -1;
            ECache.RColumn [ID] := rrr;
         end;
```

-continued

```
12:    begin // Put BColumn
           ECache.EColumn [ID] := Row [-1];
       end;
13:    begin // PutPivotColumn
           ECache.EColumn [ID] := ppp;
       end;
14:    begin //DoForceNonBasic
           if ID = -1 then
               for i := -1 to MaxRow do
                   Row [i] := Row [i] + ECache.ERow [i];
       end;
15:    begin // PutPositiveRow
           with ECache do
               if ID = ECache.RowID then
                   begin
                       if Row [-1] < 0 then
                           for i := -1 to MaxRow do
                               Row [i] := -Row [i];
                       ERow := Row;
                   end;
           end;
16:    begin // PutObjectiveRow
           if ID = -1 then ECache.HRow := Row;
           if ID = 0 then ECache.FRow := Row;
       end;
17:    begin // ForcePositive
           if (ID > 0) and (Row [-1] = 0) then Row [-1] := ECache.Perturbation;
       end;
end;
```

Most of the methods in Action are used only occasionally or just at the beginning of a run or at the end. The four that are used most often and deserve to be implemented most efficiently are the methods used to perform a pivot exchange. We will look at them in detail to illustrate the technical innovations they invoke.

The most technically challenging aspect involves reading from and writing into ECache. To perform a pivot exchange the Conductor starts by writing the entries read from a column of the A matrix into ECache.AColumn. It then writes 7 into ECache.MethodID and triggers the ERows to run Action.

All the ERows read ECache.AColumn simultaneously and compute the number each writes into its ppp field. This calculation creates the virtual A column. Each entry in this virtual A column is held by one of the ERows. The ERow with ID-1 writes its ppp field into ECache.HCoefficient and the ERow with ID 0 writes its ppp field into ECache.FCoefficient. The Conductor uses these numbers to determine whether the column is eligible as a pivot column.

If the column is eligible the Conductor writes 8 into ECache.MethodID and triggers the ERows to run Action. The ERows compute their rrr field which they write into ECache.RColumn. The Conductor uses the entries in RColumn to select the pivot row.

The Conductor then writes the index of the pivot row into ECache.RowID and 9 into ECache.MethodID, and triggers the ERows to run Action. The ERow whose ID matches MethodID computes the entries in its Row field and writes the result into ECache.ERow.

At this point the Conductor writes the index of the pivot row into ECache.RowID, 10 into ECache.MethodID and triggers the Erows to run Action. Each ERow whose ID does not match RowID computes the entries in its Row field. At this point the pivot exchange is complete.

In the methods described here, and in all other methods, the ERows either read information from ECache simultaneously or only one writes information into a field of ECache. In all cases the fields of ECache that are accessed are predetermined and the connections can be implemented on a fixed bus rather than by memory addressing.

B. Self Indexing and Autonomy

The key to the ability of the ERows as a group to run simultaneously is that they are not addressed. They determine whether a message in ECache is for them by comparing their ID field with the RowID in ECache. When one selects an item in a store and takes it to the check out counter the item identifies itself by its product code. In a central computer the codes may be ordered but the items in the shopping cart are in an unordered pile.

The collection of ERows that make up the EMatrix are better viewed as a cloud than as an array.

IV. The Virtual Simplex Method

In its general outline the Virtual Simplex Method (VSM) is based on the Simplex Algorithm of George B. Dantzig. But the VSM is quite different since it casts the structure of the problem that it works differently and it deals with the problem on different principles.

The VSM is not a two-phase method. The VSM has a single phase, at the conclusion of which it is possible to decide that the problem is infeasible, unbounded, or has an optimal solution which the method provides.

The VSM embeds the given problem in a larger problem that the method can maintain in a form that allows steps to be taken that cannot be taken within the given problem.

The VSM is also very accurate. Computer errors caused by computer round-off do not accumulate.

The VSM is able to handle edited problems and dynamically changing problems without needing to restart from the beginning.

It is designed to take advantage of the autonomous synchronous computer (ASC) described below. Numerical calculations may be performed by this computer. With that implementation the VSM is very fast.

The VSM is based on casting a linear programming problem in what we call virtual form. The VSM with its virtual form views computer error not as numerical error but as a legitimate way of calculating slightly incorrect representations of an ideal. The virtual representation provides a measure of that deviation and the VSM has methods to move towards the ideal.

The methods provided to control error and the methods provided to allow editing the original problem are seamlessly embedded in the VSM so that they do not result in an additional computation burden.

A. Basic Feasible Form

To ensure that the decisions made by the Conductor are reliable, it is necessary to assure that the representation of the problem at the time a decision is made conforms to a standard. To achieve this we require that:

There is one basic variable for each constraint.

Every column corresponding to a basic variable is a unit column.

There are no artificial basic variables. All basic variables are either canonical or free.

The entries in the b column that correspond to canonical variables are nonnegative. Entries corresponding to free variables are unrestricted.

A representation of the problem that meets these requirements is said to be in basic feasible form.

B. The h-Problem (or Virtual Problem)

A novel feature of this method is the creation of another problem into which the given optimality problem is embedded. The objective variable for the maximization problem is designated by f, the objective variable of the dual minimization problem is designated by g, and the objective variable of the problem created to contain the maximization problem is designated by h. For consistency we will refer to the maximization problem as the f-Problem and the new problem as the h-Problem. The h-Problem is utilized to find a feasible solution for the f problem if there is one, just as Phase I does in Simplex-like methods, but the h-Problem does much more.

At the outset the a brief prologue routine is used to create this h-problem and embed the given f-Problem (the optimality problem) in it. After this prologue the h-Problem is in basic feasible form and the h-Problem can be maintained in basic feasible form throughout a run of the method.

The existence of the h-Problem makes Phase I of a traditional implementation of the Simplex Algorithm unnecessary. It goes beyond the function served by Phase I and makes it possible to control and reduce computational errors, to allow changing the given data at any time during a run of the process, and it provides a safety net whenever there is danger of taking a step that would make it impossible to maintain basic feasible form for the given optimality problem.

To set up the h-Problem one needs to know the number of constraints, which constraints are inequalities and which are equations, and the b column. A variable is assigned to each constraint. Those variables corresponding to inequality constraints are canonical variables and those corresponding to equality constraints are artificial variables. One needs to see the data in the given problem only one column at a time.

We will show how to construct the h-Problem through an example. Let us start with the following linear program.

Maximize $$f = 2x_1 + x_2 - 4x_3 + 2x_4 + x_5$$

subject to $$-x_1 + x_2 + 2x_3 - 3x_4 - x_5 = 5$$

$$2x_1 - x_2 - 10x_3 + 2x_4 + 7x_5 = -2$$

$$x_1 + 5x_2 + 3x_3 + 3x_4 - x_5 \leq 30$$

$$4x_1 - 2x_2 + 2x_3 - 2x_4 + 2x_5 \leq -1$$

A basic variable is first introduced for each constraint. The constraints take the form $$\begin{array}{lrl} z_1 & -x_1 + x_2 + 2x_3 - 3x_4 - x_5 & = 5 \\ z_2 & +2x_1 - x_2 - 10x_3 + 2x_4 + 7x_5 & = -2 \\ y_3 & +x_1 + 5x_2 + 3x_3 + 3x_4 - x_5 & = 30 \\ y_4 & +4x_1 - 2x_2 + 2x_3 - 2x_4 + 2x_5 & = -1 \end{array}$$

The two equations are enforced by requiring $z_1$ and $z_2$ to be artificial and the two inequalities are enforced by requiring $y_3$ and $y_4$ to be canonical. The problem now has a basic variable for each constraint, but two of the basic variables are artificial and the b column has two negative entries.

One can initialize the entries in the E matrix. If the number of constraints is m the E matrix is (m+2)x(m+1). The columns are indexed from 0 to m, the number of constraints. The rows are indexed from −1 to m. Here is the initial E matrix for this problem.

$$E = \begin{bmatrix} 0 & 0 & 0 & 0 & 0 \\ 1 & 0 & 0 & 0 & 0 \\ 0 & 1 & 0 & 0 & 0 \\ 0 & 0 & 1 & 0 & 0 \\ 0 & 0 & 0 & 1 & 0 \\ 0 & 0 & 0 & 0 & 1 \end{bmatrix}$$

The basic variables $z_1$, $z_2$, $y_3$, $y_4$ are associated with columns indexed 1 through 4 (remember, the first column has index 0). They are unit columns so the first two of the conditions cited for basic feasible form are satisfied.

One then reads in the b column. It is $$\begin{bmatrix} 0 \\ 5 \\ -2 \\ 30 \\ -1 \end{bmatrix}$$

The 0 row of the b column contains the negative of the constant of the objective function, zero in this case. This initial b column is stored in cache and remains unchanged throughout a run of the method unless the b column is changed by editing. An updated version of the b column is computed from this copy of the b column.

It is convenient to represent the computations by the following tables.

|    | z1 | z2 | y3 | y4 | b  | x1 | x2 | x3  | x4 | x5 |
|----|----|----|----|----|----|----|----|-----|----|----|
| h  | 0  | 0  | 0  | 0  |    | 0  | 2  | 1   | -4 | 2  | 1 |
| f  | 1  | 0  | 0  | 0  |    | 0  |    |     |    |    |   |
| z1 | 0  | 1  | 0  | 0  | 0  | 5  | -1 | 1   | 2  | -3 | -1 |
| z2 | 0  | 0  | 1  | 0  | 0  | -2 | 2  | -1  | -10| 2  | 7 |
| y3 | 0  | 0  | 0  | 1  | 0  | 30 | 1  | 5   | 3  | 3  | -1 |
| y4 | 0  | 0  | 0  | 0  | 1  | -1 | 4  | -2  | 2  | -2 | 2 |

The table on the left represents the initialized E matrix. The table on the right represents the data of the original A matrix and the b column.

The A matrix and its associated variables have not yet been imported. However, those variables are initially all nonbasic and they are assigned zeros in a basic solution so they play no role at this point. We can compute the initial basic solution from the information available now. The −1 row is associated with the h function and the 0 row is associated with the f function. The rows indexed from 1 through m are associated with basic variables, shown on the left margin. The row of the unit column of a basic variable that contains 1 determines its value. In this case the basic solution is $z_1=5$, $z_2=-2$, $y_3=30$, $y_4=-1$.

This does not satisfy the fourth requirement for basic form because there are negative entries in the b column, so action must be taken. A new canonical variable is introduced, which we will denote by $w_1$, and construct a column for it. This $w_1$ column has a −1 in the −1 row and −1's in every row for which the entry in the b column is negative. That is, it constructs the column $$\begin{bmatrix} -1 \\ 0 \\ 0 \\ -1 \\ 0 \\ -1 \end{bmatrix}$$

|    | z1 | z2 | y3 | y4 | p  | B  | x1 | x2 | x3  | x4 | x5 |
|----|----|----|----|----|----|----|----|----|-----|----|----|
| h  | 0  | 0  | 0  | 0  | -1 |    | 0  | 2  | 1   | -4 | 2  | 1 |
| f  | 1  | 0  | 0  | 0  | 0  | *  | 0  |    |     |    |    |   |
| z1 | 0  | 1  | 0  | 0  | 0  |    | 5  | -1 | 1   | 2  | -3 | -1 |
| z2 | 0  | 0  | 1  | 0  | 0  |    | -2 | 2  | -1  | -10| 2  | 7 |
| y3 | 0  | 0  | 0  | 1  | 0  |    | 30 | 1  | 5   | 3  | 3  | -1 |
| y4 | 0  | 0  | 0  | 0  | 1  | -1 |    | -1 | 4   | -2 | 2  | -2 | 2 |

In the table above p denotes the pivot column that has been constructed. This column is selected as a pivot column and a pivot row must be selected. The row in which the entry in the b column is the most negative is selected. Thus, Row 2 is selected and indicated with an asterisk. When the pivot exchange is performed the new E matrix and virtual A matrix are

|    |   | z1 | z2 | y3 | y4 | p |   | B  | x1 | x2 | x3 | x4 | x5 |
|----|---|----|----|----|----|---|---|----|----|----|----|----|----|
| h  | 0 | 0  | -1 | 0  | 0  | -1|   | 2  | -2 | 1  | 10 | -2 | -7 |
| f  | 1 | 0  | 0  | 0  | 0  | 0 | * | 0  | 2  | 1  | -4 | 2  | 1  |
| z1 | 0 | 1  | 0  | 0  | 0  | 1 |   | 5  | -1 | 1  | 2  | -3 | -1 |
| w1 | 0 | 0  | -1 | 0  | 0  | 0 |   | 2  | -2 | 1  | 10 | -2 | -7 |
| y3 | 0 | 0  | 0  | 1  | 0  | 0 |   | 30 | 1  | 5  | 3  | 3  | -1 |
| y4 | 0 | 0  | -1 | 0  | 1  | 0 |   | 1  | 2  | -1 | 12 | -4 | -5 |

The b column is now nonnegative so that the fourth requirement is satisfied. The step taken to achieve a nonnegative b column is called ForceNonNegative. It introduces a variable $w_1$ for the h-Problem. This variable is basic and is shown in the left margin associated with row 2. The column for this variable is not shown because it will not be needed.

The artificial variable $z_2$ becomes nonbasic but $z_1$ is still basic and artificial. Thus, the third requirement for basic feasible form is not satisfied. We introduce another canonical variable, which we denote by $w_2$, and construct a column for it. The column is $$\begin{bmatrix} -1 \\ 0 \\ 1 \\ 0 \\ 0 \\ 0 \end{bmatrix}$$

In general the column is constructed to have −1 in the h row, a 1 in the row associated with the basic artificial variable, and zeros elsewhere. When this pivot exchange is performed the E matrix and its associated virtual A matrix are as shown below. The operation performed by introducing this variable and column and performing the pivot exchange is called ForceNonBasic. By introducing these two new variables and carrying out ForceNonNegative and ForceNonBasic the h-Problem is now in basic feasible form.

Each of the two operations that we have performed, the ForceNonNegative and ForceNonBasic, has a −1 in the h row. This inserts the negative of each of the introduced canonical variables into the h function. The h function is always the negative of the sum of the introduced variables. For this reason the h function is always nonpositive. It can be zero only if all introduced variables are zero, that is, it always has zero as an upper bound.

Note that the artificial variables, $z_1$ and $z_2$, are now nonbasic. The h-Problem has two columns not in the f problem corresponding to the new canonical variables $w_1$ and $w_2$. They are basic variables. These variables and their associated columns are virtual and we do not have to show them. At this point the h-Problem has been cast in basic feasible form. The Conductor has completed the initialization.

i. Scanning and Pivoting

Once the h-Problem is created and the problem has been initialized one starts scanning the given problem one column at a time. One need not remember previously scanned columns or be aware of any columns that have not yet been scanned (in fact, the columns can be scanned in any order). When all columns have been scanned a circuit has been completed and one can continue scanning from the beginning. If any columns have been changed by editing or by dynamically changing conditions it is of no concern since these changes will be handled when the column containing them is scanned or rescanned. The containing h-Problem and the design of the method provide protection from bad effects of such changes.

When a column of the A matrix is imported, one uses the E matrix to compute the virtual column corresponding to the imported column. This virtual column includes the coefficients of the h function and the f function.

Column Selection Rule:

The following rule applies when scanning columns: If the column of the virtual A matrix is the column of a basic variable the Conductor performs a ForceNonBasic. This assures that every column scanned is treated as a nonbasic column, for which the following rules apply:

If the column is associated with a free variable it is selected. Otherwise the following rules apply:

If the h coefficient is negative one moves on to import the next column.

If the h coefficient is positive one selects the column as a pivot column.

If the h coefficient is zero one examines the f coefficient.

If the f coefficient is negative or zero one moves on to import the next column.

If the f coefficient is positive one selects the column as a pivot column.

Row Selection Rule:

One selects the pivot to preserve the nonnegativity of the virtual b column.

|    |   | z1 | z2 | y3 | y4 | p  |   | b  | x1 | x2 | x3 | x4 | x5 |
|----|---|----|----|----|----|----|---|----|----|----|----|----|----|
| h  | 0 | 1  | -1 | 0  | 0  | 2  |   | 7  | -3 | 2  | 12 | -5 | -8 |
| f  | 1 | 0  | 0  | 0  | 0  | 1  | * | 0  | 2  | 1  | -4 | 2  | 1  |
| w2 | 0 | 1  | 0  | 0  | 0  | 1  |   | 5  | -1 | 1  | 2  | -3 | -1 |
| w1 | 0 | 0  | -1 | 0  | 0  | 1  |   | 2  | -2 | 1  | 10 | -2 | -7 |
| y3 | 0 | 0  | 0  | 1  | 0  | 5  |   | 30 | 1  | 5  | 3  | 3  | -1 |
| y4 | 0 | 0  | -1 | 0  | 1  | -1 |   | 1  | 2  | -1 | 12 | -4 | -5 |

If there is a tie for selecting the pivot row, priority is given to the row of a variable of the h-Problem if such a variable is involved in the tie.

Otherwise, the tie is broken by giving priority to the row with the smallest index.

The effect of these rules is that the value of the h function or f function (whichever had its coefficient used to select the pivot column), cannot decrease—it will either remain the same or increase. Since the h function is always feasible and bounded above by 0 the effect is to obtain the maximum value of the h function. If this maximum is negative there is no feasible solution for the f-Problem (the optimality problem)—it is infeasible. If the maximum of the h-Problem is zero and all h variables have become nonbasic, the basic solution for the h-Problem and the f-Problem are identical. In this case we have obtained a feasible solution for the f-Problem.

Prior use of methods based on the Simplex Algorithm lack these h coefficients. To this extent these rules are different from the selection rules for any prior use of methods based on the Simplex Algorithm.

ii. Basic Columns

A major innovation in the Virtual Simplex Method is found in the way the Conductor handles basic columns. Two-phase Simplex-like methods create an auxiliary problem that is worked in Phase I. Once the auxiliary problem is created it is not changed, and it is discarded when Phase I terminates. In contrast, in the VSM the h-Problem is maintained throughout the run and it can be modified at any time by adjoining new canonical variables. The VSM uses this capability whenever it scans a basic column. It introduces a new h variable and performs a ForceNonBasic so that the scanned variable becomes nonbasic. In this way the VSM treats every variable as a nonbasic variable.

In a traditional implementation of the Simplex-like methods, basic columns are always skipped because they are already basic and are ineligible for selection as a pivot column. Furthermore, basic columns are skipped on the grounds that it is known what the values in these columns should be—they should all be exactly unit columns. But because of computer errors in the calculations on a digital computer, that assumption is not justified—it is, in fact, almost always incorrect.

Whenever a basic column is scanned in the VSM, a new variable is introduced into the h-Problem and VSM performs a ForceNonBasic operation that exchanges the scanned variable and the introduced variable so that the scanned basic variable is forced to become nonbasic.

From a conceptual point of view the ForceNonBasic operation is a pivot exchange. However, since it is performed every time a basic column is imported it is worth the effort to implement it in a much simpler form. Since the pivot entry is 1, division of the pivot row by the pivot entry is unnecessary. And since the only other entry in the pivot column is the −1 in the h row, the ForceNonBasic operation can be performed simply by adding the pivot row to the h row without doing the multiplications and divisions usually required. Therefore the computational load imposed by performing the ForceNonBasic operation on every basic column is negligible.

As a result the VSM treats every scanned column as a nonbasic column. A basic column is converted to a nonbasic column and then it is handled as a nonbasic column in the usual way. Most of the time, the result on a scanned basic column is that the introduced variable is immediately pivoted out, so that the basic column is returned to being a basic column with improved accuracy; we call this a Pivot-in-Place (PIP). But when the column is edited (dynamically changed), this procedure incorporates the change into the problem. This has important implications for the way the Virtual Simplex Method can handle edited problems and control accuracy.

iii. Edited Problems

If a coefficient in a nonbasic column is changed by editing (because of an error or by a change in dynamic or time-sensitive data), the Conductor is not aware of the change until the column is imported to scan. The coefficients in that column are multiplied by nonbasic variables which are assigned zeros in a basic solution. Thus the editing has no effect on the basic solution until the column is imported. At that time the column is treated in the same way it would have been had it not been edited. It is just another imported column.

If a coefficient in a basic column is changed, it does affect the basic solution. But again, the Conductor is not aware of the change until the column is imported. Because the column is made nonbasic by the ForceNonBasic operation, the column is treated as just another imported column. In fact, the program can be configured to run and scan columns continuously even after it finds an optimum to account for changing data in the coefficient matrix. In this case, the optimal solution will be adjusted to deal with the new data.

If one imports a basic column that has not been edited, the basic column will become nonbasic. If the computer errors in the computations which have preceded and which produced the column are reasonably small, the column will be almost a unit column. That means there will be one entry in that column that is very nearly 1, and that term in the column will dominate the other terms, which will all be nearly 0, and VSM will select the row of the just-introduced variable as the pivot row. In that case the operation is a Pivot-in-Place and the effect will be to reduce any accumulated round-off errors in that column.

How this works can be illustrated by examples. If the example we have been considering is worked to obtain an optimal solution we get:

|    |   | z1    | z2    | y3    | y4 |
|----|---|-------|-------|-------|----|
| h  | 0 | 0     | 0     | 0     | 0  |
| f  | 1 | 1.5   | 0     | -0.5  | 0  |
| x5 | 0 | 0.344 | 0.188 | -0.03 | 0  |
| x2 | 0 | 0.281 | 0.062 | 0.156 | 0  |
| x1 | 0 | -1.06 | -0.13 | 0.188 | 0  |
| y4 | 0 | 4.125 | 0.25  | -0.38 | 1  |

|    | b     | x1       | x2      | x3      | x4    | x5      |
|----|-------|----------|---------|---------|-------|---------|
|    | 0     | 0        | 0       | 0       | 0     | 0       |
|    | -7.5  | 7.8E-16  | -4E-16  | -2.5    | -4    | 5.6E-16 |
|    | 0.406 | 6.9E-18  | 0       | -1.2813 | -0.75 | 1       |
|    | 5.969 | 0        | 1       | 0.40625 | -0.25 | -3E-16  |
|    | 0.563 | 1        | 0       | -0.3125 | 3.5   | 6.9E-16 |
|    | 7.875 | 0        | 8.9E-16 | 6.625   | -15   | -2E-15  |

The left table is the E matrix and the right table is the virtual b column and virtual A matrix. Since the h function is zero and the b column is nonnegative, the f problem has a basic solution and it is feasible. Since the coefficients in the f row except for the artificial columns are nonpositive, the basic solution is optimal.

Suppose that the initial A matrix is edited and the 5 in the $x_2$ column is changed to a 4. When one imports the $x_2$ column, one notes that the column is a basic column so it executes a ForceNonBasic. That is, it adds the $x_2$ row to the h row. We then have:

|    |   | z1    | z2    | y3    | y4 | b     | x2      |
|----|---|-------|-------|-------|----|-------|---------|
| h  | 0 | 0.281 | 0.062 | 0.156 | 0  | 5.969 | 0.84375 |
| f  | 1 | 1.5   | 0     | -0.5  | 0  | -7.5  | 0.5     |
| x5 | 0 | 0.344 | 0.188 | -0.03 | 0  | 0.406 | 0.03125 |
| w  | 0 | 0.281 | 0.062 | 0.156 | 0  | 5.969 | 0.84375 |
| X1 | 0 | -1.06 | -0.13 | 0.188 | 0  | 0.563 | -01875  |
| y4 | 0 | 4.125 | 0.25  | -0.38 | 1  | 7.875 | 0.375   |

The second row is now associated with the introduced basic variable w. The $x_2$ column is not a unit column and, without the introduced variable, the problem would not be in basic feasible form. One examines the $x_2$ column and, since the entry in the h row is positive, it selects the column as a pivot column. It then selects the w row as the pivot row and executes a pivot exchange. The table below is the result:

|    |   | z1    | z2    | y3    | y4 | b      | x1       | x2 | x3       | x4       | x5      |
|----|---|-------|-------|-------|----|--------|----------|----|----------|----------|---------|
| h  | 0 | 0     | 0     | 0     | 0  | 0      | 0        | 0  | 0        | 0        | 0       |
| f  | 1 | 1.333 | -0.04 | -0.59 | 0  | -11    | 2.2E-16  | 0  | -2.7407  | -3.8519  | 2.2E-16 |
| x5 | 0 | 0.333 | 0.185 | -0.04 | 0  | 0.185  | 0        | 0  | -1.2963  | -0.7407  | 1       |
| x2 | 0 | 0.333 | 0.074 | 0.185 | 0  | 7.074  | -1E-16   | 1  | 0.48148  | -0.2963  | -3E-16  |
| X1 | 0 | -1    | -0.11 | 0.222 | 0  | 1.889  | 1        | 0  | -0.222   | 3.44444  | 0       |
| y4 | 0 | 4     | 0.222 | -0.44 | 1  | 5.222  | 0        | 0  | 6.44444  | -14.889  | 0       |

Again, we have an optimal solution. The maximum value of the optimality function is now 11 instead of 7.5. The set of basic variables is unchanged in this example, but that is not always the result. Instead of changing the 5 in the $x_2$ column to 4, let's change it to 6. We then obtain the following tables:

|    |   | z1    | z2    | y3    | y4 | b     | x2       |
|----|---|-------|-------|-------|----|-------|----------|
| h  | 0 | 0.281 | 0.062 | 0.156 | 0  | 5.969 | 1.15625  |
| f  | 1 | 1.5   | 0     | -0.5  | 0  | -7.5  | -0.5     |
| x5 | 0 | 0.344 | 0.188 | -0.03 | 0  | 0.406 | -0.03125 |
| w  | 0 | 0.281 | 0.062 | 0.156 | 0  | 5.969 | 1.15625  |
| x1 | 0 | -1.06 | -0.13 | 0.188 | 0  | 0.563 | 0.1875   |
| y4 | 0 | 4.125 | 0.25  | -0.38 | 1  | 7.875 | -0.375   |

Again, the $x_2$ column is selected as the pivot column, but this time the $x_1$ row is selected as the pivot row. When this pivot exchange is performed we have:

|    |   | z1    | z2    | y3 | y4 | b    | x3       |
|----|---|-------|-------|----|----|------|----------|
| h  | 0 | 6.833 | 0.833 | -1 | 0  | 2.5  | 2.33333  |
| f  | 1 | -1.33 | -0.33 | 0  | 0  | -6   | -3.3333  |
| x5 | 0 | 0.167 | 0.167 | 0  | 0  | 0.5  | -1.3333  |
| w  | 0 | 6.833 | 0.833 | -1 | 0  | 2.5  | 2.33333  |
| x2 | 0 | -5.67 | -0.67 | 1  | 0  | 3    | -1.6667  |
| y4 | 0 | 2     | 0     | 0  | 1  | 9    | 6        |

The $x_3$ column is selected as the pivot column and the w row is selected as the pivot row. When that pivot exchange is performed we get

|    |   | z1     | z2    | y3    | y4 |   | b      | x3      |        |         |         |         |
|----|---|--------|-------|-------|----|---|--------|---------|--------|---------|---------|---------|
| h  | 0 | 0      | 0     | 0     | 0  |   | 0      | 0       | 0      | 0       | 0       | 0       |
| f  | 1 | 8.429  | 0.857 | -1.43 | 0  | * | -2.43  | -6.1429 | -2E-16 | -4E-15  | -25.857 | 4.4E-16 |
| x5 | 0 | 4.071  | 0.643 | -0.57 | 0  |   | 1.929  | -3.3571 | 0      | -9E-16  | -12.643 | 1       |
| x3 | 0 | 2.929  | 0.357 | -0.43 | 0  |   | 1.071  | -2.6429 | 0      | 1       | -9.3571 | -2E-16  |
| x2 | 0 | -0.79  | -0.07 | 0.286 | 0  |   | 4.786  | 0.92857 | 1      | -8E-16  | 3.07143 | 1.1E-16 |
| y4 | 0 | -15.6  | -2.14 | 2.571 | 1  |   | 2.571  | 17.8571 | -2E-15 | 1.8E-15 | 48.1429 | 2.2E-15 |

This is an optimal solution. The set of basic variables is different.

These examples do not exhaust the possibilities. If the 5 is changed to a 7, the problem becomes infeasible. Generally, the ForceNonBasic operation introduces a variable into the h-Problem. By continuing to scan, the method tries to drive the h function upward. If it is able to reach zero, the f Problem is feasible and further scanning will try to find an optimal solution for the f-Problem. If the h-Problem is not able to reach zero, the f-Problem is infeasible.

C. Computational Accuracy

When a computer carries out a calculation it represents the result in a series of digits. Every computer has some maximum number of digits it can use to make this representation. In a computer these are usually digits in base 2, but the base actually doesn't matter, so for the purpose of clarity we are going to give a very simplified example using the more familiar base 10. Let's say our computer can hold eight significant digits in base 10 in a representation. (Most computers hold more than eight significant digits, and, of course, they do their arithmetic in base 2 instead of base 10, but, again, this is not important for the example—the point is that all computers have such a maximum number of digits (almost always in base 2) that can be used and we're going to do this example with a hypothetical computer that can use only eight significant digits in base 10.)

When our computer calculates the quotient 1 divided by 2 (1/2), it renders the result as 0.50000000. There is no error in this representation. But if our computer is asked to represent the number that results when 1 is divided by 3, since it can hold only eight significant digits, it will represent the quotient 1/3 as 0.33333333. (We've used the phrase 'significant digits' here because computers can "hold" more digits than their digit maximum when the leading digits are zeros because they can also store an integer that says how many such zeros there are (as long as that integer isn't too big); the non-zero digits are called 'significant digits'. This is, in fact, how modern computers store real numbers, holding the characteristic and the mantissa in separate parts of the representation. This is unimportant for our discussion here—we only want to point out that this does not alter the issue we are trying to illustrate in the example.) This representation of 1/3 as 0.33333333 is in error. In fact, we can say exactly what the error is in this example even though the computer doesn't know what it is—the representation is off by 1/3,000,000,000. This is not a large error (and in most modern computers the error would be even smaller than this since today's machines usually can hold more than eight significant digits in the representation), but it is an error nonetheless, and this error is unavoidable—it is intrinsic to the computing device being used and to the particular arithmetic calculation it has been asked to complete. This kind of error is sometimes called "round-off" error. If the computer is asked to compute the quotient 2 divided by 3 it will represent the result as 0.66666667, which is again in error by 1/3,000,000,000.

The type of error represented by the 1/3 example is an error that is an unavoidable consequence of the specific calculation being done and the number of digits the particular computer can use to represent the answer. This kind of error is essential (or unavoidable) computer error. No technique, algorithm, or method can avoid the possibility of essential computer error when the particular calculation being executed on the computing device being used to do it would require more significant digits to represent than the computer has.

Now let's continue this simple example to show what the situation is when essential computer errors appear and then propagate and grow worse because of a sequence of calculations. Let's have our hypothetical computer with eight digits of base 10 accuracy in its representations make the following sequence of calculations. First it is to calculate the quotients 1/3, 1/7, 19/3, 9/17, 119/5, and 25/119. All but one of these calculations will have a small error in its representation because of the limit of eight digits in the computer. In fact, the sizes of the errors can be calculated (by hand) in each case. Then the computer is to multiply the five numbers together. The results, given in both rational fractions and in the eight digit representations the computer uses, are in the table below together with the percentage error in the calculations:

| Fraction | 8 Digit Representation | Percentage Error, in Millionths of a Percent |
| --- | --- | --- |
| 1/3 | 3.3333333E−01 | 1.00000000 |
| 1/7 | 1.4285714E−01 | 2.00000000 |
| 19/3 | 6.3333333E+00 | 0.05263157 |
| 9/17 | 5.2941176E−01 | 0.88888889 |
| 119/5 | 2.3800000E+01 | 0.00000000 |
| 25/119 | 2.1008403E−01 | 1.72000000 |
| 2261/595 (the product of the above numbers) | 3.79999985E+00 | 3.94736842 |

Although the error in each of these fractions is small, and so is the error in the product, note that the error percentage in the product is more than twice the error percentage of any of the individual representations of the quotients—this is how essential computer error (from round-off error) can propagate to create larger errors. The error in this case is still not big (just less than 4 millionths of a percent), but there are only a handful (11 to be exact) of arithmetic calculations in the sequence of steps in our example. In actual implementations of real-world linear programming problems, the size of the problem can be large—thousands of rows and millions of columns, so that there are tens or hundreds of billions of entries in the A matrix—so the number of calculations to be carried out is frequently in the hundreds of billions of calculations, and in such problems the propagation of this kind of error can be a severe difficulty—in one example based on only the fractions in the table above, at about ten million arithmetic operations the percentage error can be raised to over 32%—essentially a worthless result ruined by the accumulation of these small round-off errors. The kind of error in this example is due to round-off error, but there are other kinds of intrinsic computer errors that as well.

Another type of error that is due to the problem and the computer it's run on involves other ways of losing significant digits—most of the information in the calculation can be lost because of the operations that are involved. For instance, if there are two numbers involved in a subtraction, 34,567,207 minus 34,567,201, both operands have eight significant digits; the result, which is 6, has only one significant digit—because of the inner product operation that is used frequently in the pivot operation of any Simplex-like method often produces results of this kind, loss of significant digits in this way is a particularly difficult problem.

It is the accumulation of these kinds of errors until much of the actual information in the problem is lost that causes many of the difficulties with traditional methods that employ Simplex-like techniques. Because VSM always maintains (or in some implementations periodically maintains, and always has at the end) a system that is exactly equivalent to the original system, any computer errors that occur in computations in VSM on the way to the solution are immaterial; the only computer errors that can appear in a solution produced by VSM are those associated with the essential computer errors in the calculations used to compute E'b in the very last step, those errors are the unavoidable because of the structure of the problem itself and the computer it's run on. VSM escapes the fate of other methods that carry with them the accumulated errors the result from previous calculations.

Methods based on the Simplex Algorithm depend on producing a sequence of representations of the original problem that leads to a final representation which is, in theory, equivalent to the original problem, and for which the solution is obvious. But the intrusion of computer error has several effects on the effectiveness of such computational methods. Computer error may lead to representations of the problem that are not actually equivalent to the original problem. Computer error can lead to approximations to the solution that differ considerably from the exact solution. And computer error can lead to representations of the problem that cause these Simplex-like methods to fail.

By contrast, VSM embeds the original problem in a virtual problem that can be maintained in basic feasible form. Because of this a VSM run cannot fail. VSM handles computer errors in a new way; the method essentially insures that computer errors are "forgotten"—that is, they do not accumulate—so they have no lasting effect. During a VSM run the problem is represented in a form which is equivalent to the original problem (either continuously or by periodically updating to such a format that all previous computer errors become irrelevant.) VSM uses a new measure of error that can be estimated and can be used to make the accuracy of the solution as good as the condition of the problem and the computer on which the problem is run allow.

We assume that the original problem has been expanded to the containing virtual problem cast in the form $Ax=b$. A simple way to describe the situation at any point in a VSM run is to represent the problem with an ordered triple of elements, the first of which is the original matrix A, the second of which is the current invertible matrix E, and the final of which is the column vector Eb. At the beginning, when we usually start with the invertible identity matrix I, we represent the situation with the triple $\{A; I; b\}$. At any later stage, with the invertible matrix E as our current candidate for the left inverse of A, we would have $\{A; E; Eb\}$ as the representation. We perform a sequence of pivot exchanges as prescribed by VSM until we obtain the representation $\{A; E'; b'\}$. The system of equations represented in this way is $E'Ax=b'$. All methods that employ a version of the Simplex Algorithm rely on the existence of a submatrix C of A such that $E'C=I$; implementations of such methods assume that the calculations involved in that matrix are exact, and if that were actually true the system would reduce to $x=b'$. That is, $b'$ is a solution of the system of equations $Ax=b$; this solution is referred to as a basic solution. But because computer errors inevitably occur in almost all problems the assumption that $E'C=I$ is actually false, and in that case $b'$ is not a solution. It is merely the right hand side of the system of equations $E'Ax=b'$.

Even further, because of computer error the system $E'Ax=b'$ is not even equivalent to the original system of equations, that is, this system and the original system do not have the same solution sets. But we can easily obtain a system of equations equivalent to the original system simply by replacing $b'$ by $E'b$ so that the system takes the form $E'Ax=E'b$. The only requirement to ensure that this system is equivalent to the original system is the requirement that $E'$ be invertible. This operation restores the representation to $\{A; E'; E'b\}$ which is, again, equivalent to the original problem The important point here is that regardless of whatever computer errors have been incurred between these two representations, the new system is exactly equivalent to the original system as long as E is invertible. If the system is in basic feasible form we can continue with the run of VSM and any computer errors that might have occurred up to this point do not matter because the two systems will have exactly the same solutions. In essence, whatever computer errors might have occurred in getting to any particular E' are of no consequence; they are effectively forgotten as long as E' is invertible.

If the entries in E'b are non negative, the system will be in basic feasible form. If there are negative entries in E'b VSM performs a ForceNonNegative operation to restore basic feasible form. When doing ForceNonNegative the entries in the pivot column for this operation are all zeros, ones, and minus ones, so the arithmetic used in carrying out the operation is exact and no further errors are introduced. Thus, at the cost of the small expense of introducing a new virtual variable, the system is restored to basic feasible form and the representation is equivalent to the original system. The only computer errors that can be present are those that result from computing E'A and E'b (the computer errors from just the most recent calculations—no calculation errors are carried over or accumulated).

Let us turn our attention to the matrix E at a point where the representation [Eb E] is equivalent to the original problem. If the pivot operations leading to this point were performed without computer error we would have EC=I where C is the sub matrix of A corresponding to the columns of the basic variables.

It is useful to regard E as being without error but as not necessarily the right matrix for the purpose. It can be off the mark in two ways. The set of basic variables may not be optimal and/or E may not be the exact left inverse of the basic submatrix C. This changes our goal from preventing errors from occurring to taking corrective action when they do. Fortunately, the steps to be taken are the same in either case.

If the next column to be scanned is a nonbasic column the selection rules for VSM are applied. If the column is basic, VSM executes a ForceNonBasic. This changes the status of the column to nonbasic, and it is treated as any other nonbasic column.

If the selection rules select the formerly basic column as the pivot column, the resulting action is (usually) a PIP. The set of basic columns is not changed and the entries in $\Delta$ are reduced, or at least not increased. If the selection rules do not select the formerly basic column, a virtual variable is introduced as a basic variable. The set of basic variables is changed because keeping the same set of basic variables would introduce a negative entry into the b column. Before long the row selection rules will select the row of the virtual variable and re-introduce a decision variable as a basic variable.

How often one should replace b by Eb to restore an exactly equivalent representation is a matter of judgment. In principle you could do it after every pivot, and one embodiment of VSM does precisely that. To do this requires either holding a copy of the original b column in every row processor (which is slightly expensive of memory) or recalculating Eb after every step and moving the result to the processors, which is expensive of time. So the version of the program that we have written to validate VSM makes this calculation once in every circuit, which seems to be a good compromise. For a static problem that is probably sufficiently often. Since a termination rule declares an optimal solution when it completes a circuit without finding a new basic variable, VSM will restore equivalence in the last circuit before termination in any event.

If VSM is used for a problem that changes dynamically, it may be desirable to restore equivalency more often, perhaps as often as every pivot, in which case holding a copy of b in every row processor is a good choice.

As a way of demonstrating how stable VSM is against computational errors, we have set some sample problems to illustrate how it "forgets" computational errors. Hilbert matrices are well known examples of ill conditioned matrices. They are useful for our examples because we can compute the exact inverses of these matrices by other means. This allows us to compare the results produced by VSM with exact results.

We constructed a system of equations with a 10×10 Hilbert coefficient matrix. VSM produced a solution that was accurate to five significant digits. VSM also computes the $\Delta$s. These were of the order of magnitude of $10^{-5}$, consistent with the observed accuracy. Then, to demonstrate the ability of VSM to recover from computational errors by "forgetting" previous errors, we arbitrarily truncated the entries in E to two digits—that is, we introduced deliberate errors to mess up the solution. When we did this, the solution we obtained was accurate to only two significant digits and the $\Delta$s were consistent. Then we continued the run of VSM which recovered the five place accuracy. The PIPs improved the accuracy to best that could be obtained for this problem.

We then constructed a 10×25 linear program in which the 10×10 Hilbert matrix was embedded. We constructed the problem deliberately to have an optimal solution for which the basic variables were different from the variables that were associated with the Hilbert matrix. We then started VSM and forced it to perform a sequence of pivot exchanges down the main diagonal of the Hilbert matrix. That is, it attempted to invert the Hilbert matrix. This was immediately followed by replacing b' by Eb and performing a ForceNonNegative. This produced a representation of the problem that was equivalent to the original problem but for which the solution provided by Eb was accurate to only five significant digits. The run was resumed and it produced the optimal solution accurate to 15 significant digits, consistent with the condition of the sub matrix corresponding to the basic variables.

We also constructed a system of equations with a 15×15 Hilbert coefficient matrix. A 15×15 Hilbert matrix is so ill-conditioned that the accumulated computer error accumulated in an attempt to invert it is so bad that all significant digits are lost entirely on just about any ordinary modern digital computer (when using ordinary floating point arithmetic). So not surprisingly, even the solution obtained by VSM had no correct significant digits and the $\Delta$s were consistent. In this problem, the underlying computer errors are so bad that all information is lost entirely.

Then we constructed a 15×40 linear program in which the 15×15 Hilbert matrix was embedded. Again, we forced VSM to perform a sequence of pivot exchanges down the main diagonal of the Hilbert matrix so that all the useful information would be lost in accumulated computer errors. This time when we replaced b' by Eb the resulting column actually had a negative entry. When this happens (usually unnoticed initially) in an attempt to solve a linear programming problem we say that the run has "gone infeasible". All traditional methods based on Simplex-like methods would fail at this point. But VSM performed a ForceNonNegative to restore the problem to basic feasible form and could continue.

Even though the E matrix at this point was not the inverse of the Hilbert matrix (it can't be—the entries in the actual inverse of the 15×15 Hilbert matrix, which we can calculate by hand using other much more computationally-expensive techniques, include many entries so small that they cannot be represented in most 32 bit digital computers) the problem was represented by a form fully equivalent to the original problem and we could resume the run of VSM because even though the E matrix we had at that point consisted of gibberish, it was invertible, which is all VSM needs. As VSM proceeded on this difficult problem, at one of the occasions when the problem was updated to restore equivalency a negative entry appeared in Eb. ForceNonNegative restored basic feasible form. Despite the deliberate introduction of these errors, the VSM run terminated with the correct optimal solution accurate to 15 significant digits.

We do not claim that VSM can provide solutions more accurate than the condition of the basic submatrix C or the number of bits of accuracy the computer is capable of presenting allow since no method can be more accurate than the underlying problem and computational accuracy allow. We do claim that VSM can provide solutions as accurate as the condition of the basic submatrix allows and that errors that occur in the computation, and in particular round-off errors and underflow errors that cause other methods to fail, do not accumulate in VSM. We claim that a VSM run can pass through an ill conditioned vertex without failure. We claim that after passing through an ill conditioned vertex VSM will recover whatever accuracy is available.

D. An Edited b Column

One writes the new b column into ECache.BColumn and triggers the ERows to compute a new virtual b column. One then triggers the ERows to write the new b column into ECache.EColumn. One then inspects the entries in this new virtual b column.

If all the entries in the new virtual b column are nonnegative, all the conditions for optimality are met and the new basic solution is feasible and optimal. If there are negative entries in the new virtual b column one performs a ForceNonNegative operation to make the b column nonnegative. This will introduce a new basic variable for the h-Problem.

In the following table, the 30 in the b column has been changed to 29. Nothing in the solution is changed except the b column. It is still nonnegative so the resulting basic solution is optimal.

|    | z1 | z2 | y3 | y4 | p |    | b     | x1   | x2    | x3    | x4    | x5    |
|----|----|----|----|----|---|----|-------|------|-------|-------|-------|-------|
| h  |    |    |    |    |   |    |       |      |       |       |       |       |
| f  |    |    |    |    |   |    | 0     | 2    | 1     | -4    | 2     | 1     |
| z1 |    |    |    |    |   |    | 5     | -1   | 1     | 2     | -3    | -1    |
| z2 |    |    |    |    |   |    | -2    | 2    | -1    | -10   | 2     | 7     |
| y3 |    |    |    |    |   |    | 29    | 1    | 5     | 3     | 3     | -1    |
| y4 |    |    |    |    |   |    | 1     | 4    | -2    | 2     | -2    | 2     |
|    |    |    |    |    |   |    |       |      |       |       |       |       |
| h  | 0  | 0  | 0  | 0  | 0 |    | 0     | 0    | 0     | 0     | 0     | 0     |
| f  | 1  | 1.5| 0  |-0.5| 0 |    | -7    | 0    | 0     | -2.5  | -4    | 0     |
| x5 | 0  |0.344|0.188|-0.03| 0 |    | 0.438 | 0    | 0     | -1.28 | -0.75 | 1     |
| x2 | 0  |0.281|0.062|0.156| 0 |    | 5.813 | -0   | 1     | 0.406 | -0.25 | -0    |
| x1 | 0  |-1.06|-0.13|0.188| 0 |    | 0.375 | 1    | 0     | -0.31 | 3.5   | 0     |
| y4 | 0  |4.125|0.25 |-0.38| 1 |    | 8.25  | 0    | 0     | 6.625 | -15   | 0     |

If further editing is done in which the edited entry is changed to 28 or 27 the new basic solutions are still feasible and optimal. But when the entry is changed to 26 the basic solution is no longer optimal. This time −0.19 appears in the b column.

|    | z1 | z2 | y3 | y4 | p |    | b   | x1 | x2 | x3  | x4 | x5 |
|----|----|----|----|----|---|----|-----|----|----|-----|----|----|
| h  |    |    |    |    |   |    | 0   | 2  | 1  | -4  | 2  | 1  |
| f  |    |    |    |    |   |    | 5   | -1 | 1  | 2   | -3 | -1 |
| z1 |    |    |    |    |   |    | -2  | 2  | -1 | -10 | 2  | 7  |
| z2 |    |    |    |    |   |    | 29  | 1  | 5  | 3   | 3  | -1 |
| y3 |    |    |    |    |   |    | 1   | 4  | -2 | 2   | -2 | 2  |
| y4 |    |    |    |    |   |    |     |    |    |     |    |    |

-continued

| | | | | | | | | | | | | |
|---|---|---|---|---|---|---|---|---|---|---|---|---|
| h | 0 | 0 | 0 | 0 | 0 | -1 | 0 | 0 | 0 | 0 | 0 | 0 |
| f | 1 | 1.5 | 0 | -0.5 | 0 | 0 | -5.5 | 0 | 0 | -2.5 | -4 | 0 |
| x5 | 0 | 0.344 | 0.188 | -0.03 | 0 | 0 | 0.531 | 0 | 0 | -1.28 | -0.75 | 1 |
| x2 | 0 | 0.281 | 0.062 | 0.156 | 0 | 0 | 5.344 | -0 | 1 | 0.406 | -0.25 | 0 |
| x1 | 0 | -1.06 | -0.13 | 0.188 | 0 | -1 | -0.19 | 1 | 0 | -0.31 | 3.5 | 0 |
| y4 | 0 | 4.125 | 0.25 | -0.38 | 1 | 0 | 9.375 | 0 | 0 | 6.625 | -15 | 0 |
| h | 0 | 1.063 | 0.125 | -0.19 | 0 | 0.313 | 0.188 | -1 | 0 | 0.313 | -3.5 | 0 |
| f | 1 | 1.5 | 0 | -0.5 | 0 | -2.5 | -5.5 | 0 | 0 | -2.5 | -4 | 0 |
| x5 | 0 | 0.344 | 0.188 | -0.03 | 0 | -1.28 | 0.531 | 0 | 0 | -1.28 | -0.75 | 1 |
| x2 | 0 | 0.281 | 0.062 | 0.156 | 0 | 0.406 | * | 5.344 | -0 | 1 | 0.406 | -0.25 | 0 |
| w | 0 | 1.063 | 0.125 | -0.19 | 0 | 0.313 | 0.188 | -1 | 0 | 0.313 | 3.5 | 0 |
| y4 | 0 | 4.125 | 0.25 | -0.38 | 1 | 6.625 | 9.375 | 0 | 0 | 6.625 | -15 | 0 |
| h | 0 | 0 | 0 | 0 | 0 | | 0 | 0 | 0 | 0 | 0 | 0 |
| f | 1 | 10 | 1 | -2 | 0 | | -4 | -8 | 0 | 0 | -32 | 0 |
| x5 | 0 | 4.7 | 0.7 | -0.8 | 0 | | 1.3 | -4.1 | 0 | -0 | -15.1 | 1 |
| x2 | 0 | -1.1 | -0.1 | 0.4 | 0 | | 5.1 | 1.3 | 1 | 0 | 4.3 | 0 |
| x1 | 0 | 3.4 | 0.4 | -0.6 | 0 | | 0.6 | -3.2 | 0 | 1 | 11.2 | 0 |
| y4 | 0 | -18.4 | -2.4 | 3.6 | 1 | | 5.4 | 21.2 | 0 | 0 | 59.2 | 0 |

In response, one constructs the p column shown in the second row of tables and performs a ForceNonNegative operation. This introduces an additional canonical variable, not shown, and makes the h function nonzero. The important point here is that this operation restores basic feasible form. The Conductor proceeds with scanning and pivoting until a new optimal solution is obtained in the last row of tables.

E. Inserting or Removing a Variable

An inserted variable can be handled by adding the column that represents it to the A matrix. When it gets scanned in its turn it will either be determined to be a column eligible for a pivot exchange or it will not. There is no need for special treatment.

If a variable is removed and it is nonbasic, its column can be removed from the array of columns. The basic solution at the time of its removal had assigned a zero to the variable, so its removal has no effect.

If the variable is basic the Conductor can simply change the feasibility specification of the variable to artificial. No further action need be taken. When the column is imported, VSM will perform a ForceNonBasic operation that will change the status of the variable to nonbasic. With an artificial feasibility specification it will never be selected as a pivot column again, so it can then be removed without difficulty.

F. Termination

VSM scans the columns of the A matrix looking for a pivot column. If it finds a pivot column it then tries to find a pivot row. If it finds a pivot row it triggers the ERows to perform a pivot exchange and continues to scan the columns of the A matrix. This routine continues until VSM fails to find a pivot column or fails to find a pivot row. We must look at the significance of each such event.

IF VSM selects a pivot column and fails to find a pivot row, that means the column has a positive entry in one of the two objective rows and it is not restricted in size. That is, the problem is unbounded. Since the h function is always bounded above by 0, that implies that the f-Problem is unbounded.

Generally, a failure to find a pivot column means that every column has been scanned and a new candidate for a pivot column is not available. The h-Problem being worked is always feasible, so this means that a maximum value of the h function has been reached. If this value is nonzero the h function cannot be made zero and the f-Problem is infeasible.

If the h function is zero, it means that the basic feasible solution is a solution of the f-Problem, so we have an optimal solution to the f-Problem.

G. Cycling

Every method must deal with the possibility that a run will stall without arriving at termination in a finite number of iterations. In methods based on the Simplex Algorithm this possibility is referred to as cycling. Examples have been constructed for which the Simplex Algorithm cycles.

Several methods for preventing or recovering from cycling have been developed. They are almost never incorporated in a method based on a version of the Simplex Algorithm intended for commercial use because the risk of cycling in a real world problem appears to be small, and because the computing resources consumed in implementing these methods are deemed to be too costly for the return of preventing cycling. It has been part of the folklore of the field that real applied problems do not cycle. The few that have occurred in practice are so rare that they became news events.

The ability of the Virtual Simplex Method to handle edited data makes it possible to devise methods for coping with cycling that demand only negligible computer resources. It is possible, for example, to alter the entries in the b column slightly so that it contains no zero entries. Methods based on the Simplex Algorithm will not cycle when no zeros appear in the b column. Perturbing the entries in the b column slightly does not impair the optimal solution when it is achieved with these slightly altered entries because after breaking out of the cycle the problem can be edited again to restore the original b column and obtain an optimal solution with the original data. One of the possible methods based on this idea has been incorporated into the Virtual Simplex Method.

H. Bookkeeping

Since a computer cannot see the data kept by the Erows, it needs to keep its own records to determine the status of its progress towards a solution. Initially, it creates a basic variable for each constraint. The initial E matrix is an identity matrix so each of these variables is also associated with a column of the E matrix. To distinguish between these two sets of variables, the variables associated with the rows are called basic variables and the variables associated with the columns are called slack variables. The computer must maintain one array of records for the basic variables and another array of records for the slack variables.

The association of a slack variable with a column is fixed throughout a run of work on a problem. The association of a basic variable with a row changes with each pivot exchange. Whenever a pivot exchange is performed, one basic variable becomes nonbasic. The computer drops that variable from the array of basic variables, and the computer makes a nonbasic variable basic and inserts it into the array of basic variables.

The computer must maintain another list of records for the columns of the A matrix. It creates this array as the columns are scanned for the first time. Each of these records contains information about its associated variable—whether it is canonical, free, or artificial, whether it is basic or nonbasic, and if it is basic, the index of the row with which the column is associated and the index of the column with which the row is associated.

When the computer scans the columns of the E matrix, it skips those columns that are artificial. When it scans the rows looking for a pivot row it skips free variables.

When the computer looks at the value of ECache.FCoefficient, it stores this number with the record of the column that was scanned. If the variable is nonbasic this number is the negative of the value of its dual variable. After each pivot exchange these numbers are no longer the values of these dual variables. However, the last cycle of scans before the VSM halts with solution to the f-Problem, a scan that necessarily results in a failure to find a pivot column, will leave the correct values here. Finally, when the computer finds an optimal solution, it needs this information to find all the numbers it needs to construct the full solution.

V. Applications

The Virtual Simplex Method can be applied to a host of different problems. For example, linear programming is applicable to a variety of different industries, such as but not limited to transportation, energy, agriculture, telecommunications, and manufacturing. It can be used to maximize income. It can be used to minimize costs of production. Thus, for example, it can be used in financial management and trading to maximize performance. As one such example, it can be used in trading of commodities such as mortgages. The speed of the VSM allows it to be used with great efficiency and thus allows it to perform trades to achieve a better return than could be accomplished with traditional methods. The VSM can also be used for resource allocation, such as human resource allocation and machine resource allocation. These are but a few examples of how the VSM can be used.

The VSM can also be utilized to manage a power grid. For example, the allocation of resources across a power grid could be implemented through the use of the VSM in order to enhance system performance.

To perform at least one embodiment, a computer system can be utilized. For example, FIG. 1 illustrates a block diagram of a device that can be used. System 100 is shown comprised of hardware elements that are electrically coupled via bus 108, including a processor 101, input device 102, output device 103, storage device 104, computer-readable storage media reader 105a, communications system 106 processing acceleration (e.g., DSP or special-purpose processors) 107 and memory 109. Computer-readable storage media reader 105a is further coupled to computer-readable storage media 105b, the combination comprehensively representing remote, local, fixed and/or removable storage devices plus storage media, memory, etc. for temporarily and/or more permanently containing computer-readable information, which can include storage device 104, memory 109 and/or any other such accessible system 100 resource. System 100 also comprises software elements (shown as being currently located within working memory 191) including an operating system 192 and other code 193, such as programs, applets, data and the like.

System 100 has extensive flexibility and configurability. Thus, for example, a single architecture might be utilized to implement one or more servers that can be further configured in accordance with currently desirable protocols, protocol variations, extensions, etc. However, it will be apparent to those skilled in the art that embodiments may well be utilized in accordance with more specific application requirements. For example, one or more system elements might be implemented as sub-elements within a system 100 component (e.g. within communications system 106). Customized hardware might also be utilized and/or particular elements might be implemented in hardware, software (including so-called "portable software," such as applets) or both. Further, while connection to other computing devices such as network input/output devices (not shown) may be employed, it is to be understood that wired, wireless, modem and/or other connection or connections to other computing devices might also be utilized. Distributed processing, multiple site viewing, information forwarding, collaboration, remote information retrieval and merging, and related capabilities are each contemplated. Operating system utilization will also vary depending on the particular host devices and/or process types (e.g. computer, appliance, portable device, etc.) Not all system 100 components will necessarily be required in all cases.

While various embodiments of the invention have been described as methods or apparatus for implementing the invention, it should be understood that the invention can be implemented through code coupled to a computer, e.g., code resident on a computer or accessible by the computer. For example, software and databases could be utilized to implement many of the methods discussed above. Thus, in addition to embodiments where the invention is accomplished by hardware, it is also noted that some embodiments can be accomplished through the use of an article of manufacture comprised of a computer usable medium having a computer readable program code embodied therein, which causes the enablement of the functions disclosed in this description. Therefore, it is desired that such embodiments of the invention also be considered protected by this patent in their program code means as well. Furthermore, embodiments of the invention may be embodied as code stored in a computer-readable memory of virtually any kind including, without limitation, RAM, ROM, magnetic media, optical media, or magneto-optical media. Even more generally, embodiments of the invention could be implemented in software, or in hardware, or any combination thereof including, but not limited to, software running on a general purpose processor, microcode, PLAs, or ASICs.

It is also envisioned that embodiments of the invention could be accomplished as computer signals embodied in a carrier wave, as well as signals (e.g., electrical and optical) propagated through a transmission medium. Thus, the various information discussed above could be formatted in a structure, such as a data structure, and transmitted as an electrical signal through a transmission medium or stored on a computer readable medium.

It is also noted that many of the structures, materials, and acts recited herein can be recited as means for performing a function or step for performing a function. Therefore, it should be understood that such language is entitled to cover all such structures, materials, or acts disclosed within this specification and their equivalents, including the matter incorporated by reference.

It is thought that the apparatuses and methods of embodiments and its attendant advantages will be understood from this specification. While the above description is a complete description of specific embodiments, the above description should not be taken as limiting the scope of the invention as defined by the claims.

What is claimed is:

1. A method of optimizing a linear optimization problem subject to a change of constraints, said method comprising:
   determining a first set of constraints for said linear optimization problem;
   initializing the optimization problem into an initial feasible format to be operated on by the computer;
   initiating processing by a computer to optimize said optimization problem in accordance with said first set of constraints;
   determining a second set of constraints different from said first set of constraints;
   continuing processing with said computer to optimize said optimization problem by using said second set of constraints in place of said first set of constraints without having to re-initialize the optimization problem into another initial feasible format;
   wherein said optimization problem has "m" constraints and wherein said determining said first set of constraints for said linear optimization problem comprises:
   determining if said constraint(s) contain any inequalities;
   determining if said constraint(s) contain any equalities;
   modifying each of said equality constraint(s) by adding a different artificial variable to each of said equality constraint(s);
   converting each of said inequality constraint(s) by adding a different canonical variable to each of said inequality constraint(s) so as to make each inequality constraint an equality;
   wherein the constraints $\sum_{j=1}^{n} a_{ij} x_j + y_i = b_i$ with $y_i \geq 0$ for $i=1,\ldots,m$ and with each $y_i$ being a slack variable satisfy the relationship $[A][X]+[I][Y]=[B]$,
   wherein [A] is a matrix having m rows and n columns and contains the values $a_{ij}$ for $i=1,\ldots,m$ and for $j=1,\ldots,n$ and represents the coefficients for the variables in matrix [X],
   wherein [X] is a matrix having n rows and one column and storing the values $x_j$ for $j=1,\ldots,n$,
   wherein [Y] is a matrix having m rows and one column and represents the variables $y_i$ for $i=1$ to m and
   wherein [B] is a matrix having m rows and one column and represents a matrix of numbers $b_j$ for $i=1,\ldots,m$, and
   wherein [I] is an identity matrix having m rows and m columns.

2. The method of claim 1 wherein the optimization problem is initially presented in feasible form.

3. The method of claim 1 wherein the optimization problem is initially presented in infeasible form.

4. The method as claimed in claim 1 wherein said continuing processing with said computer to optimize said optimization problem by using said second set of constraints in place of said first set of constraints without having to re-initialize the optimization problem into the initial format comprises:
   revising [A] to reflect said second set of constraints.

5. The method as claimed in claim 1 and further comprising:
   storing said first set of constraints in said computer.

6. The method as claimed in claim 5 and further comprising:
   revising said first set of constraints stored in said computer so as to reflect said second set of constraints.

7. The method as claimed in claim 1 and further comprising:
   determining with said computer a solution to said optimization problem subject to said first set of constraints; and
   wherein said continuing processing with said computer to optimize said optimization problem by using said second set of constraints in place of said first set of constraints without having to re-initialize the optimization problem into the initial format comprises:
   continuing to optimize said optimization problem after determining said solution.

8. The method as claimed in claim 1 and further comprising:
   attempting to determine with said computer a solution to said optimization problem subject to said first set of constraints; and
   wherein continuing processing with said computer to optimize said optimization problem by using said second set of constraints in place of said first set of constraints without having to re-initialize the optimization problem into the initial format comprises:
   continuing to process said optimization problem with said computer prior to determining said solution.

9. The method as claimed in claim 1 wherein said continuing processing with said computer to optimize said optimization problem by using said second set of constraints in place of said first set of constraints without having to re-initialize the optimization problem into the initial format comprises:
   revising [B] to reflect said second set of constraints.

10. An article of manufacture comprising:
    a non-transitory computer usable medium having computer readable program code means embodied therein for causing optimization of a linear optimization problem subject to a change of constraints, the computer readable program code means in said article of manufacture comprising:
    computer readable program code for causing a computer to effect determining a first set of constraints for said linear optimization problem;
    computer readable program code for causing said computer to effect initiating processing by a computer to optimize said optimization problem in accordance with said first set of constraints;

computer readable program code for causing said computer to effect determining a second set of constraints different from said first set of constraints;
computer readable program code for causing said computer to effect continuing processing with said computer to optimize said optimization problem by using said second set of constraints in place of said first set of constraints without having to re-initialize the optimization problem into the initial format;
wherein said optimization problem has "m" constraints and wherein said computer readable program code for causing said computer to effect determining said first set of constraints for said optimization problem comprises:
computer readable program code for causing said computer to effect determining if said constraint(s) contain any inequalities;
computer readable program code for causing said computer to effect determining if said constraint(s) contain any equalities;
computer readable program code for causing said computer to effect modifying each of said equality constraint(s) by adding a different artificial variable to each of said equality constraint(s);
computer readable program code for causing said computer to effect converting each of said inequality constraint(s) by adding a different canonical variable to each of said inequality constraint(s) so as to make each inequality constraint an equality;
computer readable program code for causing said computer to effect representing the constraints as matrices in accordance with the relationship:

$$[A][X]+[I][Y]=[B]$$

wherein for the constraints $\sum_{j=1}^{n} a_{ij}x_j + y_i = b_i$ with $y_i \geq 0$ for i=1, ..., m and with each $y_i$ being a slack variable:
[A] is a matrix having m rows and n columns and contains the values $a_{ij}$ for i=1, ..., m and for j=1, ..., n and represents the coefficients for the variables in matrix [X],
[X] is a matrix having n rows and one column and storing the values x for j=1, ..., n,
[Y] is a matrix having m rows and one column and represents the variables $y_i$ for i=1 to m,
[B] is a matrix having m rows and one column and represents a matrix of numbers $b_i$ for i=1, ..., m, and
[I] is an identity matrix having m rows and m columns.

11. The article of manufacture as claimed in claim 10 wherein said computer readable program code for causing said computer to effect continuing processing with said computer to optimize said optimization problem by using said second set of constraints in place of said first set of constraints without having to re-initialize the optimization problem into the initial format comprises:
computer readable program code for causing said computer to effect revising [A] to reflect said second set of constraints.

12. The article of manufacture as claimed in claim 10 and further comprising:
computer readable program code for causing said computer to effect storing said first set of constraints in said computer.

13. The article of manufacture as claimed in claim 12 and further comprising:
computer readable program code for causing said computer to effect revising said first set of constraints stored in said computer to reflect said second set of constraints.

14. The article of manufacture as claimed in claim 10 and further comprising:
computer readable program code for causing said computer to effect determining with said computer an initial solution to said optimization problem subject to said first set of constraints; and
wherein said computer readable program code for causing said computer to effect continuing processing with said computer to optimize said optimization problem by using said second set of constraints in place of said first set of constraints without having to re-initialize the optimization problem into the initial format comprises:
computer readable program code for causing said computer to effect continuing to optimize said optimization problem after determining said initial solution.

15. The article of manufacture as claimed in claim 10 and further comprising:
computer readable program code for causing said computer to effect attempting to determine with said computer a solution to said optimization problem subject to said first set of constraints; and
wherein said computer readable program code for causing said computer to effect continuing processing with said computer to optimize said optimization problem by using said second set of constraints in place of said first set of constraints without having to re-initialize the optimization problem into the initial format comprises:
computer readable program code for causing said computer to effect continuing to optimize said optimization problem prior to determining said solution.

16. The article of manufacture as claimed in claim 10 wherein said computer readable program code for causing said computer to effect continuing processing with said computer to optimize said optimization problem by using said second set of constraints in place of said first set of constraints without having to re-initialize the optimization problem into the initial format comprises:
computer readable program code for causing said computer to effect revising [B] to reflect said second set of constraints.

* * * * *

UNITED STATES PATENT AND TRADEMARK OFFICE
CERTIFICATE OF CORRECTION

PATENT NO.        : 8,359,286 B1
APPLICATION NO.   : 12/481424
DATED             : January 22, 2013
INVENTOR(S)       : Nering et al.

Page 1 of 1

It is certified that error appears in the above-identified patent and that said Letters Patent is hereby corrected as shown below:

In the Claims

At column 43, line 59, please delete "$j = 1$" and insert therefor -- $\sum_{j=1}^{n}$ --.

At column 43, line 59, please delete "$y_i \; 0$" and insert therefor -- $y_i \geq 0$ --.

At column 44, line 2, please delete "m" and insert therefor -- m, --.

At column 44, line 4, please delete "$b_j$" and insert therefor -- $b_i$ --.

At column 45, line 34, please delete "$j = 1$" and insert therefor -- $\sum_{j=1}^{n}$ --.

At column 45, line 34, please delete "$y_i \; 0$" and insert therefor -- $y_i \geq 0$ --.

At column 45, line 41, please delete "values x" and insert therefor -- values $x_j$ --.

Signed and Sealed this
Fourteenth Day of June, 2016

Michelle K. Lee
*Director of the United States Patent and Trademark Office*